United States Patent
Bieberich et al.

(10) Patent No.: US 9,354,122 B2
(45) Date of Patent: May 31, 2016

(54) ZERO-HEAT-FLUX, DEEP TISSUE TEMPERATURE MEASUREMENT SYSTEM

(75) Inventors: Mark T. Bieberich, Edina, MN (US); Philip G. Dion, Blaine, MN (US); Gary L. Hansen, Eden Prairie, MN (US); David R. Palchak, Brisbane, CA (US); Timothy J. Prachar, Menlo Park, CA (US); Ryan J. Staab, Mineapolis, MN (US); Albert P. Van Duren, Chaska, MN (US); Elecia White, San Jose, CA (US); Allen H. Ziaimehr, Arden Hills, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1114 days.

(21) Appl. No.: 13/373,529

(22) Filed: Nov. 17, 2011

(65) Prior Publication Data
US 2012/0289855 A1 Nov. 15, 2012

Related U.S. Application Data

(60) Provisional application No. 61/518,766, filed on May 10, 2011.

(51) Int. Cl.
*A61B 5/01* (2006.01)
*G01K 1/16* (2006.01)

(52) U.S. Cl.
CPC ...................................... *G01K 1/165* (2013.01)

(58) Field of Classification Search
CPC .. A61B 5/01; A61B 5/6833; A61B 2562/164; A61B 2562/0276; G01K 13/002; G01K 1/16; G01K 1/165
USPC ..................... 324/158, 750.03; 374/163, 183; 600/549
See application file for complete search history.

(56) References Cited

U.S. PATENT DOCUMENTS

| 1,363,259 | A | 12/1920 | Mills |
| 1,526,641 | A | 2/1925 | Mulvany et al. |

(Continued)

FOREIGN PATENT DOCUMENTS

| CA | 2 538 940 A1 | 6/2006 | ............... A61B 5/00 |
| CA | 2 583 034 A1 | 9/2007 | ............... A61B 5/01 |

(Continued)

OTHER PUBLICATIONS

Fox RH, et al, A new technique for monitoring the deep body temperature in man from the intact skin surface. *J. Physiol.* 1971; 212(2): 8P-10P.

(Continued)

*Primary Examiner* — Rene Towa
(74) *Attorney, Agent, or Firm* — X. Christina Huang

(57) ABSTRACT

A zero-heat-flux, deep tissue temperature measurement system measures internal body temperature by way of a probe having a heater and thermal sensors arranged in a zero-heat-flux construction. The measurement system includes control mechanization that determines heater and skin temperatures based upon data obtained from the probe and uses those temperatures to calculate a deep tissue temperature. The measurement system includes a signal interface cable having a connector where a probe can be releasably connected to the system. The cable and attached connector are a removable and replaceable part of the system, separate from the probe. The measurement system provides an output signal imitating a standard input signal configuration used by other equipment.

22 Claims, 23 Drawing Sheets

(56) References Cited

U.S. PATENT DOCUMENTS

| | | | |
|---|---|---|---|
| 1,528,383 A | 3/1925 | Schmidt | |
| 1,638,943 A | 8/1927 | Little | |
| 2,378,804 A | 6/1945 | Sparrow et al. | |
| 2,381,819 A | 8/1945 | Graves et al. | |
| 2,519,785 A | 8/1950 | Okolicsanyi | |
| 2,629,757 A | 2/1953 | McKay | |
| 2,807,657 A | 9/1957 | Jenkins et al. | 136/4 |
| 2,969,141 A | 1/1961 | Katzin | 206/16.5 |
| 3,099,575 A | 7/1963 | Hill | 117/212 |
| 3,099,923 A | 8/1963 | Benzinger | 73/341 |
| 3,215,265 A | 11/1965 | Welin-Berger | 206/63.2 |
| 3,235,063 A | 2/1966 | Jarund | 206/16.5 |
| 3,238,775 A | 3/1966 | Watts | 73/190 |
| 3,301,394 A | 1/1967 | Baermann et al. | 206/63.2 |
| 3,367,182 A | 2/1968 | Baxter | 73/190 |
| 3,427,209 A | 2/1969 | Hager, Jr. | 136/225 |
| 3,469,685 A | 9/1969 | Baermann | 206/63.2 |
| 3,552,558 A | 1/1971 | Poncy | 206/63.2 |
| 3,581,570 A | 6/1971 | Wortz | 73/355 R |
| 3,607,445 A | 9/1971 | Hines | 136/225 |
| 3,720,103 A | 3/1973 | Adams et al. | 73/190 H |
| 3,767,470 A | 10/1973 | Hines | 136/225 |
| 3,781,749 A | 12/1973 | Iles et al. | 338/25 |
| 3,809,230 A | 5/1974 | Poncy | 206/306 |
| 3,833,115 A | 9/1974 | Schapker | 206/63.2 |
| 3,877,463 A | 4/1975 | Cary et al. | 128/2 H |
| 3,933,045 A | 1/1976 | Fox et al. | 73/359 |
| 3,942,123 A | 3/1976 | Georgi | 328/1 |
| 4,022,063 A | 5/1977 | West et al. | 73/362 |
| 4,024,312 A | 5/1977 | Korpman | 428/343 |
| 4,142,631 A | 3/1979 | Brandriff | 206/306 |
| 4,149,066 A | 4/1979 | Niibe | |
| 4,182,313 A | 1/1980 | Aslan | |
| 4,253,469 A | 3/1981 | Aslan | 128/736 |
| 4,275,741 A | 6/1981 | Edrich | 128/653 |
| 4,347,854 A | 9/1982 | Gosline et al. | 128/654 |
| 4,407,292 A | 10/1983 | Edrich | 128/653 |
| 4,494,550 A | 1/1985 | Blazek et al. | 128/653 |
| 4,539,994 A | 9/1985 | Baumbach et al. | 128/635 |
| 4,541,734 A | 9/1985 | Ishizaka | 374/169 |
| 4,572,213 A | 2/1986 | Kawahara | 128/736 |
| 4,574,359 A | 3/1986 | Ishizaka et al. | 364/557 |
| 4,577,976 A | 3/1986 | Hayashi et al. | 374/29 |
| 4,592,000 A | 5/1986 | Ishizaka et al. | 364/557 |
| 4,629,336 A | 12/1986 | Ishizaka | 364/557 |
| 4,648,055 A | 3/1987 | Ishizaka et al. | 364/557 |
| 4,652,145 A | 3/1987 | Bjornberg | 374/194 |
| 4,669,049 A | 5/1987 | Kosednar et al. | 364/557 |
| 4,747,413 A | 5/1988 | Bloch | 128/736 |
| 4,841,543 A | 6/1989 | Dittmar et al. | 374/44 |
| 4,859,078 A | 8/1989 | Bowman et al. | 374/44 |
| 4,899,297 A | 2/1990 | Sano et al. | 364/557 |
| 4,955,380 A | 9/1990 | Edell | 128/635 |
| 4,987,579 A | 1/1991 | Yoshinaka et al. | 377/25 |
| 5,002,057 A | 3/1991 | Brady | 128/652 |
| 5,015,102 A | 5/1991 | Yamaguchi | 374/107 |
| 5,033,866 A | 7/1991 | Kehl et al. | 374/179 |
| 5,040,901 A | 8/1991 | Suzuki | 374/183 |
| 5,050,612 A | 9/1991 | Matsumura | 128/670 |
| 5,062,432 A | 11/1991 | James et al. | 128/736 |
| 5,088,837 A | 2/1992 | Shiokawa et al. | 374/185 |
| 5,149,200 A | 9/1992 | Shiokawa et al. | 374/185 |
| 5,172,979 A | 12/1992 | Barkley et al. | 374/147 |
| 5,178,468 A | 1/1993 | Shiokawa et al. | 374/185 |
| 5,199,436 A | 4/1993 | Pompei et al. | 128/664 |
| 5,255,979 A | 10/1993 | Ferrari | 374/158 |
| 5,263,775 A | 11/1993 | Smith et al. | 374/134 |
| 5,293,877 A | 3/1994 | O'Hara et al. | 128/736 |
| 5,483,190 A | 1/1996 | McGivern | 327/34 |
| 5,516,581 A | 5/1996 | Kreckel et al. | 428/317.3 |
| 5,576,224 A | 11/1996 | Yakura | |
| 5,816,706 A | 10/1998 | Heikkila et al. | 374/134 |
| 5,884,235 A | 3/1999 | Ebert | 702/87 |
| 5,990,412 A | 11/1999 | Terrell | 136/225 |
| 5,993,698 A | 11/1999 | Frentzel et al. | 252/511 |
| 6,001,471 A | 12/1999 | Bries et al. | 428/343 |
| 6,014,890 A | 1/2000 | Breen | 73/29.02 |
| 6,019,507 A | 2/2000 | Takaki | 374/161 |
| 6,059,452 A | 5/2000 | Smith et al. | 374/169 |
| 6,203,191 B1 | 3/2001 | Mongan | 374/43 |
| 6,220,750 B1 | 4/2001 | Palti | 374/164 |
| 6,224,543 B1 | 5/2001 | Gammons et al. | 600/124 |
| 6,231,962 B1 | 5/2001 | Bries et al. | 428/317.3 |
| 6,253,098 B1 | 6/2001 | Walker et al. | 600/344 |
| 6,255,622 B1 | 7/2001 | May et al. | 219/209 |
| 6,278,051 B1 | 8/2001 | Peabody | 136/225 |
| 6,280,397 B1 | 8/2001 | Yarden et al. | 600/549 |
| 6,283,632 B1 | 9/2001 | Takaki | 374/161 |
| 6,292,685 B1 | 9/2001 | Pompei | 600/474 |
| 6,312,391 B1 | 11/2001 | Ramadhyani et al. | 600/549 |
| 6,355,916 B1 | 3/2002 | Siefert | 219/494 |
| 6,377,848 B1 | 4/2002 | Garde et al. | 604/20 |
| 6,398,727 B1 | 6/2002 | Bui et al. | 600/300 |
| 6,495,806 B2 | 12/2002 | Siefert | 219/494 |
| 6,501,364 B1 | 12/2002 | Hui | |
| 6,553,243 B2 | 4/2003 | Gurley | 600/340 |
| 6,595,929 B2 | 7/2003 | Stivoric et al. | 600/549 |
| 6,676,287 B1 | 1/2004 | Mathis et al. | 374/1 |
| 6,773,405 B2 | 8/2004 | Fraden et al. | 600/549 |
| 6,827,487 B2 | 12/2004 | Baumbach | 374/164 |
| 6,886,978 B2 | 5/2005 | Tokita et al. | 374/169 |
| 6,929,611 B2 | 8/2005 | Koch | 600/549 |
| 7,059,767 B2 | 6/2006 | Tokita et al. | 374/163 |
| 7,270,476 B2 | 9/2007 | Tokita et al. | 374/107 |
| 7,299,090 B2 | 11/2007 | Koch | 600/547 |
| 7,306,283 B2 | 12/2007 | Howick et al. | 297/180.12 |
| 7,318,004 B2 | 1/2008 | Butterfield | 702/130 |
| 7,322,743 B2 | 1/2008 | Gozloo | |
| 7,354,195 B2 | 4/2008 | Sakano | 374/208 |
| 7,364,356 B2 | 4/2008 | Dicks et al. | 374/121 |
| 7,410,291 B2 | 8/2008 | Koch | 374/163 |
| 7,426,872 B2 | 9/2008 | Dittmar et al. | 73/818 |
| 7,500,780 B2 | 3/2009 | Miki | |
| 7,597,668 B2 | 10/2009 | Yarden | |
| 7,625,117 B2 | 12/2009 | Haslett | |
| 7,632,008 B2 | 12/2009 | Recht | |
| 7,896,545 B2 | 3/2011 | Pan | |
| 7,988,355 B2 | 8/2011 | Gierer | |
| 8,089,245 B2 | 1/2012 | Kato | |
| 2002/0097775 A1 | 7/2002 | Hamouda et al. | 374/29 |
| 2003/0130590 A1 | 7/2003 | Bui et al. | 600/537 |
| 2004/0076215 A1* | 4/2004 | Baumbach | 374/29 |
| 2004/0210280 A1 | 10/2004 | Liedtke | 607/96 |
| 2004/0252750 A1* | 12/2004 | Gruszecki et al. | 374/185 |
| 2005/0101843 A1 | 5/2005 | Quinn | |
| 2005/0245839 A1 | 11/2005 | Stivoric et al. | 600/549 |
| 2005/0281314 A1 | 12/2005 | Fraden | |
| 2006/0122473 A1 | 6/2006 | Kill et al. | |
| 2007/0167859 A1 | 7/2007 | Finneran et al. | 600/546 |
| 2007/0206655 A1 | 9/2007 | Haslett et al. | 374/141 |
| 2007/0282218 A1 | 12/2007 | Yarden | 600/549 |
| 2008/0170600 A1 | 7/2008 | Sattler et al. | 374/163 |
| 2008/0200969 A1 | 8/2008 | Weber | |
| 2009/0116536 A1 | 5/2009 | Amata | |
| 2009/0129433 A1 | 5/2009 | Zhang et al. | 374/102 |
| 2010/0121217 A1 | 5/2010 | Padiy | |
| 2010/0134122 A1 | 6/2010 | Furumura | |
| 2010/0220766 A1 | 9/2010 | Burgard | |
| 2010/0268113 A1 | 10/2010 | Bieberich | |
| 2010/0268114 A1* | 10/2010 | Van Duren | 600/549 |
| 2010/0292605 A1 | 11/2010 | Grassl et al. | 600/549 |
| 2011/0051076 A1 | 3/2011 | Bieberich | |
| 2011/0213227 A1* | 9/2011 | Ziv et al. | 600/323 |
| 2011/0249699 A1 | 10/2011 | Bieberich | |
| 2011/0249701 A1 | 10/2011 | Bieberich | |
| 2011/0264001 A1* | 10/2011 | Cheung et al. | 600/549 |
| 2013/0003776 A1 | 1/2013 | Bieberich | |
| 2013/0010826 A1 | 1/2013 | Le Neel | |

FOREIGN PATENT DOCUMENTS

| | | | |
|---|---|---|---|
| DE | 3527942 A1 | 2/1987 | G01K 7/00 |
| EP | 0239824 B1 | 5/1992 | G01K 13/00 |
| GB | 2266771 A | 11/1993 | G01K 1/18 |

(56) References Cited

FOREIGN PATENT DOCUMENTS

| | | | |
|---|---|---|---|
| JP | 55-29794 | 3/1980 | ............... G01K 1/16 |
| JP | 57-183832 | 12/1982 | ............... A61B 5/00 |
| JP | 61-50023 | 3/1986 | |
| JP | H08-211000 | 8/1996 | ............ G01K 25/00 |
| JP | 2002202205 A | 7/2002 | ............... G01K 7/00 |
| JP | 2007-212407 A | 8/2007 | ............... A61B 5/01 |
| JP | 2009-080000 A | 4/2009 | ............... A61B 5/04 |
| WO | WO 99/60356 A1 | 11/1999 | ............... G01K 17/00 |
| WO | WO 00/58702 A1 | 10/2000 | ............... G01K 7/02 |
| WO | WO 01/31305 A1 | 5/2001 | ............... G01K 7/42 |
| WO | WO 02/066946 A2 | 8/2002 | ............ G01K 13/00 |
| WO | WO 2007/060609 A2 | 5/2007 | ............. A61B 5/040 |
| WO | WO 2008/068665 A1 | 6/2008 | ............... G01K 1/16 |
| WO | WO 2008/078271 A1 | 7/2008 | ............... G01K 1/16 |
| WO | WO 2009/141786 A1 | 11/2009 | ............... G01K 1/16 |
| WO | WO 2010/082102 A2 | 7/2010 | ............... G01K 1/14 |
| WO | WO 2010/103436 A1 | 9/2010 | ............... G01K 1/16 |
| WO | WO 2010/116297 A | 10/2010 | ............... G01K 1/14 |
| WO | WO 2010/120360 A1 | 10/2010 | ............... G01K 1/14 |
| WO | WO 2010/120362 A1 | 10/2010 | ............ G01K 13/00 |
| WO | WO 2011/025521 A1 | 10/2010 | ............... G01K 1/16 |
| WO | WO 2011/126543 A1 | 10/2011 | ............ G01K 13/00 |
| WO | WO 2011/146098 A1 | 11/2011 | ............... G01K 1/16 |
| WO | WO 2012-112222 | 8/2012 | |

OTHER PUBLICATIONS

Solman AJ, et al, New thermometers for deep tissue temperature. *Biomedical Engineering* 1973; 8(10): 432-435.

Fox RH, et al, A new method for monitoring deep body temperature from the skin surface. *Clin. Sci.* 1973; 44: 81-86.

Togawa, T, et al, A modified internal temperature measurement device, *Medical and Biological Engineering*, May 1976, pp. 361-364.

Togawa T, Non-invasive deep body temperature measurement. In: Rolfe P (ed) *Non-invasive Physiological Measurements.* 1979; vol. 1: 261-277.

Zhang X, et al, Application of the Heat Flux Meter in Physiological Studies, *J. therm. Biol.*, 1993, vol. 18: 473-476.Yamakage M, et al, Deep temperature monitoring-comparative study between conventional and new developed monitors, *Anesthesiology*, 2002; 96: A501.

Suleman M-I, et al, Insufficiency in a new temporal-artery thermometer for adult and pediatric patients, *Anesth Analg*, 2002; 95: 67-71.

Yamakage M, Evaluation of a newly developed monitor of deep body temperature, *J. Anesth.*, 2002; 16:354-357.

Thurbide, K., Excuse me, but my Band-Aid is beeping, Haslett's smart Band-Aid/University of Calgary, Jul. 18, 2007, pp. 1-2.

Gunga H-C, et al, A non-invasive device to continuously determine heat strain in humans. *J. Ther. Bio.* 2008; 33: 297-307.

Kimberger O, Accuracy and precision of a novel non-invasive core thermometer.*BJA.* 2009; 103(2): 226-231.

Langham GE, et al, Noninvasive temperature monitoring in postanesthesia care units, *Anesthesiology*, 2009, 111; 1:1-7.

Kitamura, K, et al, Development of a new method for the noninvasive measurement of deep body temperature without a heater, *Med. Eng. Phys.*, 2010; 32(1): 1-6. Epub Nov. 10, 2009.

Zeiner A, et al; Non-invasive continuous cerebral temperature monitoring in patients treated with mild therapeutic hypothermia: an observational pilot study, *Resuscitation*, Jul. 2010; 81(7) 861-866. Epub Apr. 15, 2010.

International Search Report and Written Opinion, PCT/US2010/001108, mailed Jul. 23, 2010.

International Search Report and Written Opinion, PCT/US2010/001104, mailed Jul. 26, 2010.

International Search Report and Written Opinion, PCT/US2010/002185, mailed Dec. 13, 2010.

International Search Report and Written Opinion, PCT/US2011/000549, mailed Jun. 26, 2011.

International Search Report and Written Opinion, PCT/US2011/000552, mailed Jun. 29, 2011.

\* cited by examiner

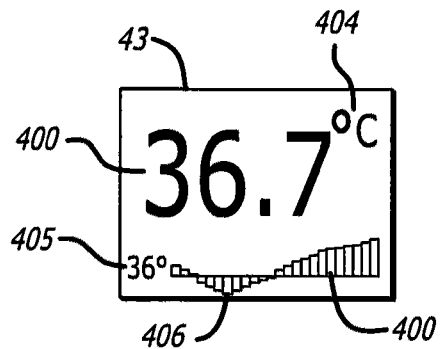
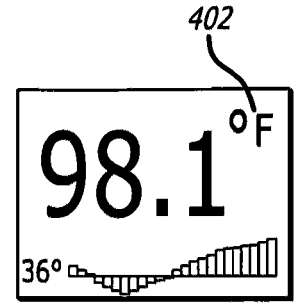
FIG. 11F    FIG. 11G
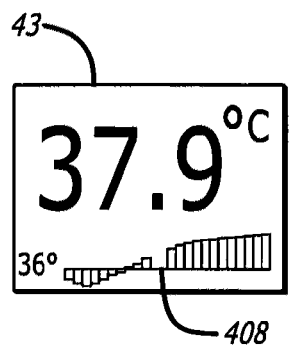
FIG. 11H
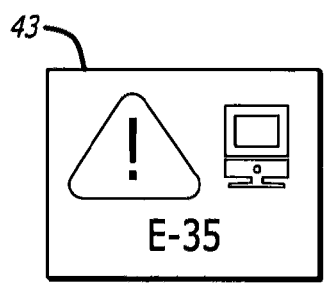
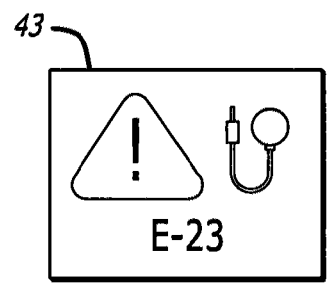
FIG. 11I    FIG. 11J

ZERO-HEAT-FLUX, DEEP TISSUE TEMPERATURE MEASUREMENT SYSTEM

RELATED APPLICATIONS

This application claims priority to U.S. provisional application for patent. 61/518,766, filed on May 10, 2011. This application also contains subject matter related to subject matter of the following US patent applications:

U.S. patent application Ser. No. 12/584,108, filed Aug. 31, 2009;

U.S. patent application Ser. No. 12/798,668, filed Apr. 7, 2010;

U.S. patent application Ser. No. 12/798,670, filed Apr. 7, 2010; and,

U.S. provisional application for patent 61/463,393, filed Feb. 16, 2011.

BACKGROUND

The subject matter relates to a system for measurement of deep tissue temperature (DTT) as an indication of the core body temperature of humans or animals. More particularly, the subject matter relates to constructions and operations of a zero-heat-flux DTT measurement system with a cable interface for connection to a disposable DTT probe.

Deep tissue temperature is a proxy measure for core temperature, which is the mass-weighted mean temperature of the body contents. It is desirable to maintain core body temperature in a normothermic range in many clinical situations. For example, during the perioperative cycle maintenance of normothermia has been shown to reduce the incidence of many adverse consequences of anesthesia and surgery, including surgical site infections and bleeding; accordingly, it is beneficial to monitor a patient's body core temperature before, during, and after surgery. Of course noninvasive measurement is highly desirable, for the safety and the comfort of a patient, and for the convenience of the clinician. Thus, it is most advantageous to obtain a noninvasive DTT measurement by way of a device placed on the skin.

Noninvasive measurement of DTT by means of a zero-heat-flux device was described by Fox and Solman in 1971 (Fox R H, Solman A J. A new technique for monitoring the deep body temperature in man from the intact skin surface. J. Physiol. January 1971:212(2): pp 8-10). Because the measurement depends on the absence of heat flux through the skin area where measurement takes place, the technique is referred to as a "zero-heat-flux" (ZHF) temperature measurement. The Fox/Solman system, illustrated in FIG. 1, estimates core body temperature using a ZHF temperature measurement device 10 including a pair of thermistors 20 separated by layer 22 of thermal insulation. A difference in the temperatures sensed by the thermistors 20 controls operation of a heater 24 of essentially planar construction that stops or blocks heat flow through a skin surface area contacted by the lower surface 26 of the device 10. A comparator 29 measures the difference in the sensed temperatures and provides the difference measurement to a controller 30. The heater 24 is operated for so long as the difference is non-zero. When the difference between the sensed temperatures reaches zero, the zero heat flux condition is satisfied, and the heater 24 is operated as needed to maintain the condition. The thermistor 20 at the lower surface 26 senses a temperature near, if not equal to, that of the skin surface area and its output is amplified at 36 and provided at 38 as the system output. Togawa improved the Fox/Solman measurement technique with a DTT measurement device structure that accounted for multi-dimensional heat flow in tissue. (Togawa T. Non-Invasive Deep Body Temperature Measurement. In: Rolfe P (ed) Non-Invasive Physiological Measurements. Vol. 1. 1979. Academic Press, London, pp. 261-277). The Togawa device encloses a Fox and Solman-type ZHF design in a thick aluminum housing with a cylindrical annulus construction that reduces or eliminates radial heat flow from the center to the periphery of the device.

The Fox/Solman and Togawa devices utilize heat flux normal to the body to control the operation of a heater that blocks heat flow from the skin through a thermal resistance in order to achieve a desired zero heat flux condition. This results in a construction that stacks the heater, thermal resistance, and thermal sensors of a ZHF temperature measurement device, which can result in a substantial vertical profile. The thermal mass added by Togawa's cover improves the stability of the Fox/Solman design and makes the measurement of deep tissue temperature more accurate. In this regard, since the goal is to achieve zero heat flux through the device, the more thermal resistance the better. However, the additional thermal resistance adds mass and size, and also increases the time required to reach a stable temperature.

The size, mass, and cost of the Fox/Solman and Togawa devices do not promote disposability. Consequently, they must be sanitized after use, which exposes them to wear and tear and undetectable damage. The devices must also be stored for reuse. As a result, use of these devices raises the costs associated with zero-heat-flux DTT measurement and can pose a significant risk of cross contamination between patients. It is thus desirable to reduce the size and mass of a zero-heat-flux DTT measurement device, without compromising its performance, in order to promote disposability.

Inexpensive, disposable, zero-heat-flux DTT measurement devices are described and illustrated in the related US patent applications ("the related applications"). A measurement device constructed according to the related applications is attached to the skin of a human or animal subject to sense the temperature of tissue deep under the skin. The measurement device is constituted of a flexible substrate and an electrical circuit disposed on a surface of the flexible substrate. The electrical circuit includes an essentially planar heater which is defined by an electrically conductive copper trace and which surrounds an unheated zone of the surface, a first thermal sensor disposed in the zone, a second thermal sensor disposed outside of the heater trace, a plurality of contact pads disposed outside of the heater trace, and a plurality of conductive traces that connect the first and second thermal sensors and the heater trace with the plurality of contact pads. Sections of the flexible substrate are folded together to place the first and second thermal sensors in proximity to each other. A layer of insulation disposed between the sections separates the first and second thermal sensors. The measurement device is oriented for operation so as to position the heater and the first thermal sensor on one side of the layer of insulation and the second thermal sensor on the other and in close proximity to an area of skin where a measurement is to be taken. The layout of the electrical circuit on a surface of the flexible substrate provides a low-profile, zero-heat-flux DTT measurement device that is essentially planar, even when the sections are folded together. Such devices are referred to as "sensors" or "probes". In the following specification such a device will be referred to as a "probe" in order to avoid ambiguity with respect to the term "thermal sensor", which is used in the specification to denote a device having an electrical property that changes in response to a change in temperature.

Given the advances in construction and performance of lightweight, disposable probes as is evidenced in the related applications, it is now desirable to establish system mechanizations and procedures that quickly produce accurate and reliable temperature measurements in response to sensed data produced by such probes. In particular, there is a need for a zero-heat-flux deep tissue temperature (DTT) measurement system that measures internal body temperature by way of a lightweight, disposable measurement probe that includes a heater and thermal sensors disposed in a zero-heat-flux construction.

Further, such a measurement system can have a construction customized for stand-alone operation. That is to say, one that does not include a standard signal output that can be accepted as an input by multi-function patient monitors. However, it is desirable that such an output signal interface conforming to a standard device or a standard input signal configuration defined for multi-function patient monitors would increase the versatility and usefulness of such a zero-heat-flux DTT measurement system.

SUMMARY

In one aspect, the disclosure concerns a zero-heat-flux DTT measurement system with a simple, low cost interface suitable for being used with disposable probes.

In another aspect, the disclosure concerns simple, effective, and inexpensive system control mechanization for lightweight probes with low thermal mass.

In yet another aspect, the disclosure concerns a zero-heat-flux DTT measurement system with a simple, low cost output signal interface conforming to a standard input signal configuration for multi-function patient monitors.

These and other aspects are embodied in a zero-heat-flux DTT measurement system with a signal interface where a probe can be connected to and disconnected from the system.

Preferably, a programmable memory for storing system information including thermal sensor calibration coefficients is located on the probe together with a heater and thermal sensors.

These and other aspects are embodied in a zero-heat-flux, DTT measurement system implementing control mechanization that checks signal continuity between the system and a probe, validates probe operation, determines skin and heater temperatures, and executes a control loop with safety measures related to measured skin and heater temperatures.

These and other aspects are embodied in a zero-heat-flux, DTT measurement system including an output signal interface conforming to a standard input signal configuration for multi-function patient monitor.

These and other aspects are embodied in a method of operating a zero-heat-flux, DTT measurement probe with a heater and thermistors for sensing skin and heater temperatures, by checking signal continuity between the probe and a probe control mechanization, validating operation of the thermal sensors, determining skin and heater temperatures sensed by the thermistors, executing a control loop to operate the heater with safety measures that are related to the measured skin and heater temperatures.

These and other aspects are embodied in a method of operating a zero-heat-flux, DTT measurement probe with a heater, thermistors, and a programmable memory device, by executing a control loop to operate the probe with security measures that are related to integrity of data and probe use information associated with the probe.

In another aspect, the disclosure concerns a signal interface conforming to a standard device or a standard input signal configuration.

This and other aspects are embodied in a system and method for emulating a standard thermistor output signal indicative of deep tissue temperature.

BRIEF DESCRIPTION OF THE DRAWINGS

FIGS. 11A-11M illustrate information screens generated during the operation of the zero-heat-flux, DTT measurement system of FIG. 2.

DETAILED DESCRIPTION

Figure 1:
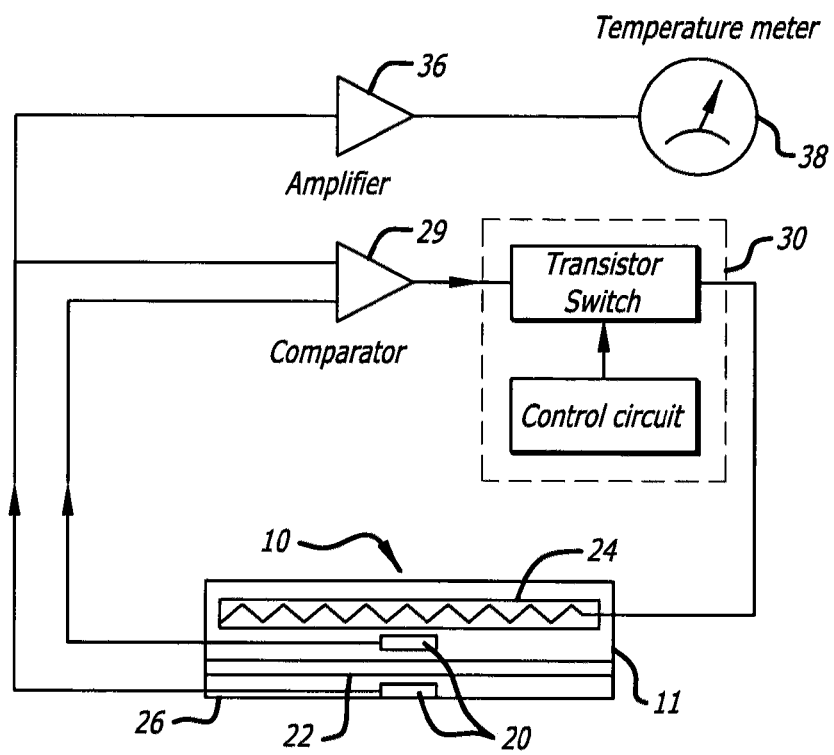
FIG. 1 is a schematic block diagram of a prior art deep tissue temperature measurement system including a zero-heat-flux DTT measurement probe.

A zero-heat-flux deep tissue temperature (DTT) measurement system measures internal body temperature by way of a zero-heat-flux DTT measurement probe that includes a heater and thermal sensors in a zero-heat-flux construction. The measurement system includes a processing and display unit with control mechanization that checks signal continuity with the probe, authenticates probe identity, decrements a use count of the probe, determines heater and skin temperatures based upon information obtained from the probe, and calculates a deep tissue temperature. The control loop implements safety measures related to measured temperatures and security measures related to integrity of data and probe use information associated with the probe. The measurement system includes a signal interface cable with an attached connector by which a probe can be physically, releasably, and electrically coupled to the system. The cable and connector together constitute a single element that is a removable and replaceable part of the system, separate from the probe. A standard output signal indicative of deep tissue temperature is provided by a measurement system emulation unit that imitates operation of a thermal sensor device.

A zero-heat-flux DTT measurement probe (hereinafter, simply "a probe") includes at least two thermal sensors, a heater, and a programmable memory device. For example, a construction for such a probe includes a flexible substrate with at least two thermal sensors disposed thereon in a spaced-apart relationship. Preferably the thermal sensors are maintained in a spaced apart relationship on respective substrate layers by a flexible thermal insulator positioned between the layers. The substrate supports at least the thermal sensors, the separating thermal insulator, the programmable memory device, and the heater. The probe construction includes a periphery with a tab by which the probe is removeably coupled with a probe signal interface cable connector.

Although a particular zero-heat-flux DTT measurement system is described in terms of a preferred embodiment comprising representative elements, the embodiment is merely illustrative. It is possible that other embodiments will include more elements, or fewer, than described. It is also possible that some of the described elements will be deleted, and/or other elements that are not described will be added. Further, elements may be combined with other elements, and/or partitioned into additional elements.

Zero-Heat-Flux DTT Measurement System

As per FIG. 2, a zero-heat-flux DTT measurement system 40 includes a processing and display unit 42 (hereinafter, "controller") and a probe 44. A signal interface cable 46 has first and second ends and a connector 48 mounted to the first end where a probe such as the probe 44 can be physically, removeably, and electrically coupled to the system. The signal interface cable 46 has a connector 50 mounted to the second end which can be inserted into and removed from a signal connector jack 52 in the controller 42. The signal interface cable 46 and connectors 48 and 50 are provided as a single integrated element that is a removable and replaceable part of the system, separate from the probe 44, and that are not formed together with the probe. In some aspects, a dongle 45 can be connected to and removed from the system by way of the signal interface cable 46, with connectors 48 and 50. As per FIG. 3, the controller 42 has an output signal jack 54 where a cable 55 can be removeably plugged to conduct an output signal produced by an emulation unit to clinical equipment such as a multi-function patient monitor 56. The output signal is indicative of deep tissue temperature measured by the system 40 and conforms to a signal produced by an emulated temperature-responsive device. A manually-operated C/F button 59 on the rear surface of the controller 42 allows a system operator to select a scale (Celsius or Fahrenheit) for indicating temperature.

Figure 2:
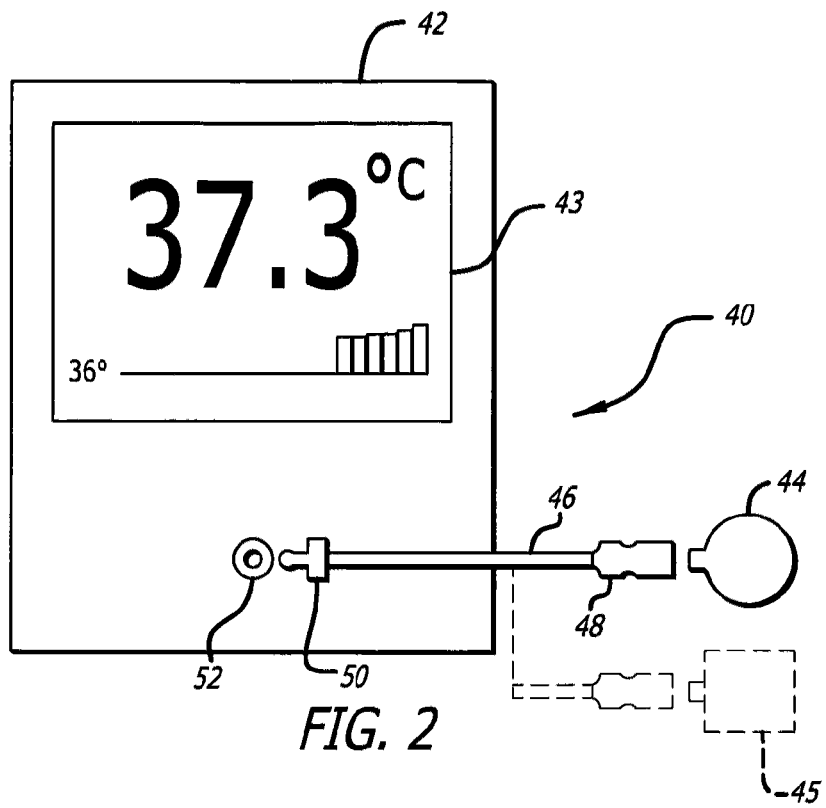
FIG. 2 is an illustration of a zero-heat-flux DTT measurement system embodying solutions to the problems described above. The illustration shows connections made between a processing and display unit and a probe.
Figure 3:
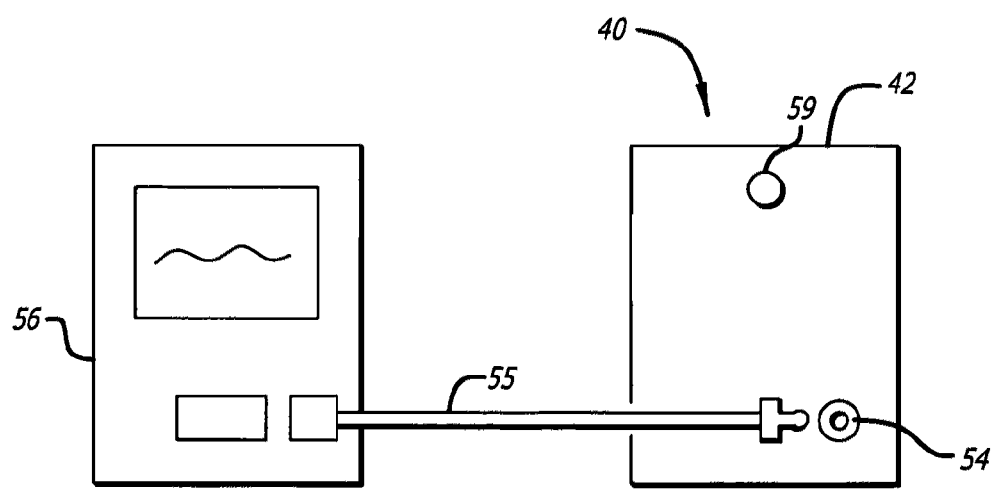
FIG. 3 is an illustration of the zero-heat-flux DTT measurement system of FIG. 2 showing the connections made between the processing and display unit and a patient monitor with a standard interface.

As seen in FIG. 2, the controller 42 includes information display elements by which measured temperatures, status indications, prompts, alarms and other system information are provided in visible form to a system operator. For example, a multi-function display panel 43 of the liquid crystal type (LCD) displays a measured temperature.

Zero-Heat-Flux DTT Probe Construction

Figure 4:
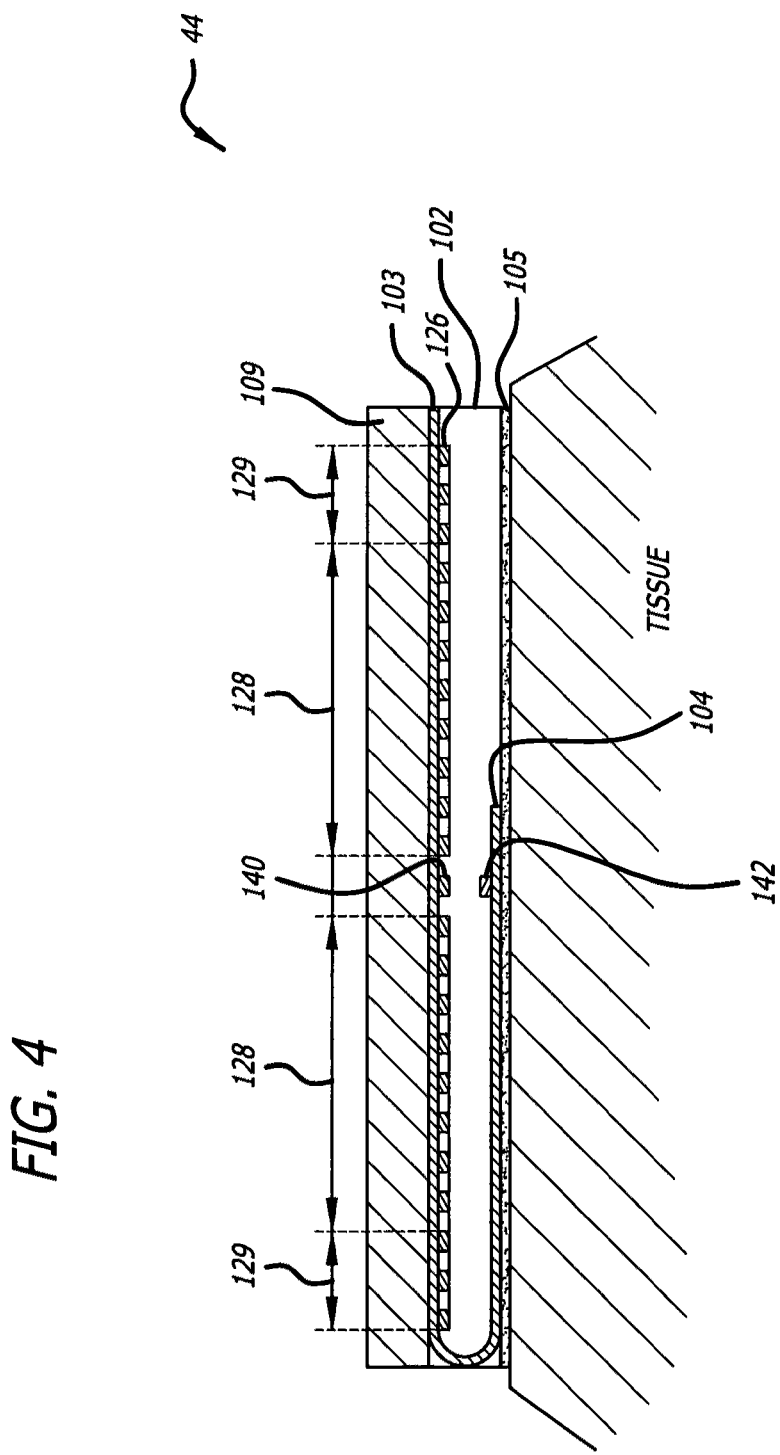
FIG. 4 is a first side sectional, partly schematic illustration of a zero-heat-flux DTT measurement probe illustrating components of a multi-layer construction.
Figure 5:
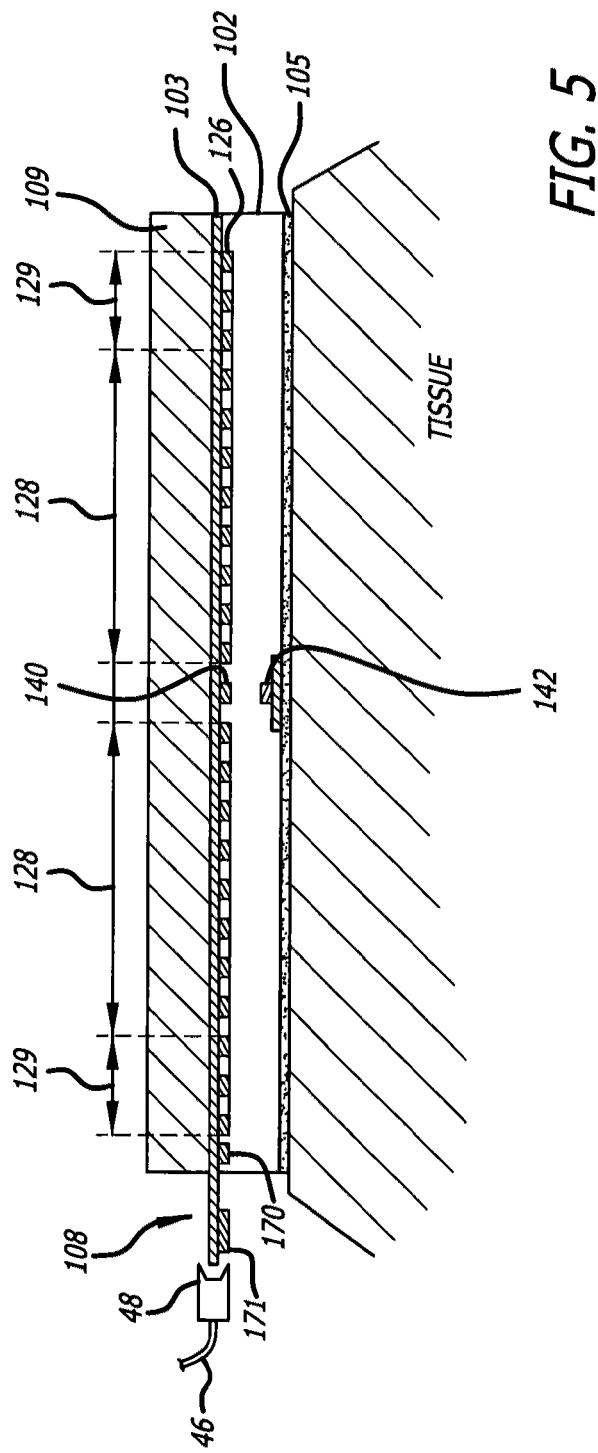
FIG. 5 is a second side sectional, partly schematic illustration of the probe of FIG. 4 rotated to illustrate a programmable memory device included in the multi-layer construction.
Figure 6:
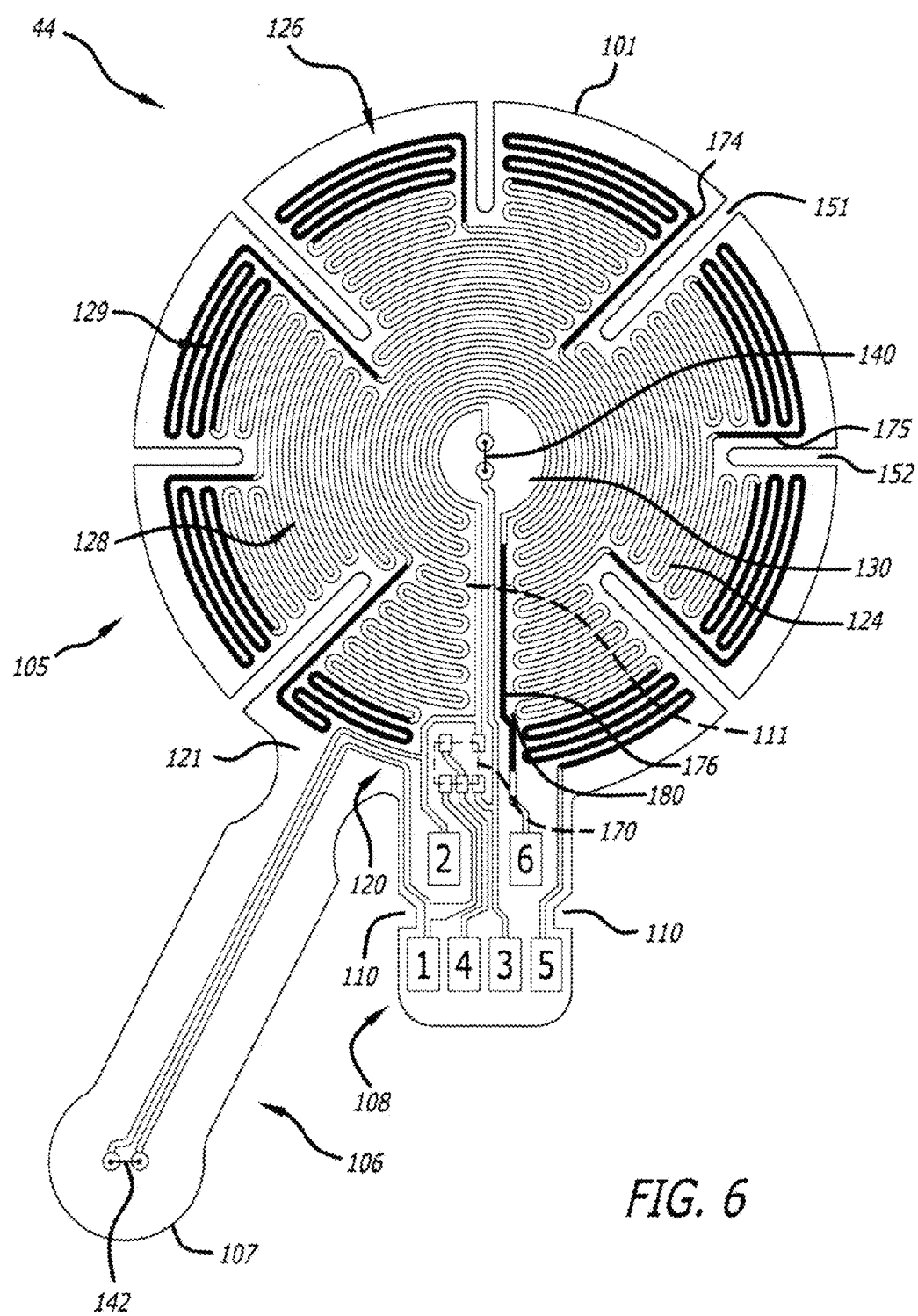
FIG. 6 illustrates a construction for assembling a zero-heat-flux DTT measurement probe.

Zero-heat-flux DTT measurement probes that can be used in the zero-heat-flux DTT measurement system are preferably, but not necessarily, constructed according to the related applications. An example of a disposable probe representative of the probe 44 in FIG. 2 is shown in FIGS. 4-6. As per these figures, a zero-heat-flux DTT measurement probe includes a flexible substrate supporting an electrical circuit in which a heater trace disposed on a first substrate layer defines a heater facing one side of a layer of thermally insulating material and surrounding a zone of the first substrate layer. A first thermal sensor is disposed in the zone, a programmable memory device is disposed on the first substrate layer outside of the heater, a second thermal sensor is disposed on the second substrate layer, a plurality of contact pads is disposed outside of the heater trace on a substrate surface, and a plurality of conductive traces connect the heater trace, the first and second thermal sensors and the programmable memory device to the contact pads.

FIG. 4 is a sectional, partially-schematic illustration of a preferred probe construction. FIG. 5 is a sectional, partially-schematic illustration of the preferred probe construction in which the section is rotated from the view of FIG. 4. As per FIG. 4, the probe 44 includes flexible substrate layers, a layer of thermally insulating material, and an electrical circuit. The electrical circuit includes a heater 126, a first thermal sensor 140, and a second thermal sensor 142. The heater 126 and the first thermal sensor 140 are disposed in or on a flexible substrate layer 103 and the second thermal sensor 142 is disposed in or on a flexible substrate layer 104. The first and second substrate layers 103 and 104 are separated by a flexible layer 102 of thermally insulating material. The flexible substrate layers 103 and 104 can be separate elements, but it is preferred that they be sections of a single flexible substrate folded around the layer of insulating material. Preferably, adhesive film (not shown) attaches the substrate to the insulating layer 102. A layer of adhesive material 105 mounted to one side of the substrate layer 104 is provided with a removable liner (not shown) to attach the probe to skin. Preferably, a flexible layer 109 of insulating material lies over the layers 102, 103, and 104 and is attached by adhesive film (not shown) to one side of the substrate layer 103. The insulating layer 109 extends over the heater 126 and the first thermal sensor 140.

As seen in FIG. 5, the electrical circuit further includes a programmable memory device 170 and contact pads 171 disposed in or on the flexible substrate layer 103. The programmable memory device 170 is positioned outside of the heater 126, preferably between the heater 126 and the contact pads 171. The contact pads 171 are positioned on a section 108 of the substrate layer 103 that projects beyond the insulating layer 109 so as to be detachably coupled with the connector 48 fixed to the first end of the cable 46. As will be explained in detail with reference to other figures, the programmable memory device 170 stores authentication data, thermal sensor calibration values, measured temperature data, probe use data, and other information. Presuming that the thermal sensors 140 and 142 are thermistors, the thermal sensor calibration information includes one or more unique calibration coefficients for each thermistor. Thus location of the programmable memory device 170 on the probe 44, between the heater 126 and the contact pads 171 permanently associates stored thermal sensor calibration information with the probe 44. Consequently, the need for a cable, with connector, permanently attached to the probe is eliminated. Moreover, since the cable 46 and connector 48 do not store unique calibration information, they can be used for any zero-heat-flux DTT measurement probe configured in accordance with the related applications.

With reference to FIGS. 4 and 5, the probe 44 is disposed on a human or animal subject with the second thermal sensor 142 nearest the skin. The layer 102 is sandwiched between the first and second substrate layers 103 and 104 so as to separate the heater 126 and first thermal sensor 140 from the second thermal sensor 142. In operation, the layer 102 acts as a thermal resistance between the first and second thermal sensors, the second thermal sensor 142, located on the surface of the layer 102 that is closest to the skin, senses the temperature of the skin, and the first thermal sensor 140 senses the temperature at the opposing surface of the layer 102 away from the body. While the temperature sensed by the first thermal sensor 140 is less than the temperature sensed by the second thermal sensor 142, the heater is operated to reduce heat flow through the layer 102 and the skin. When the temperature difference across the layer 102 is zero, heat flow through the layer 102 has been stopped. This is the zero-heat-flux condition as it is sensed by the first and second sensors 140 and 142. When the zero-heat-flux condition occurs, the temperature of the skin, indicated by the second thermal sensor, is interpreted as deep tissue temperature, if not core body temperature. When the zero heat flux condition is reached, the heater 126 is regulated as needed to maintain the condition. Preferably, but without limitation, the heater is regulated by changing the duty cycle of a square wave.

With reference to FIG. 6, a preferred construction of the substrate and electrical circuit portions of the probe 44 includes a flexible substrate 101 with contiguous sections 105, 106, and 108. Preferably, but not necessarily, the first, or center, section 105 is substantially circular in shape. The second section (or "tail") 106 has the shape of a narrow, elongated rectangle with a bulbous end 107 that extends outwardly from the periphery of the center section 105 in a first direction. The third section (or "tab") is the extended section 108 seen in FIG. 5. The tab 108 has the shape of a wide rectangle that extends outwardly from the periphery of the center section 105 in a second direction. Opposing notches 110 are formed in the tab 108 to receive and retain respective spring-loaded retainers of the connector 48. Preferably, the tail 106 is displaced from the tab 108 by an arcuate distance of less than 180° in either a clockwise or a counterclockwise direction.

As per FIG. 6, an electrical circuit 120 is disposed on the flexible substrate 101. Preferably, but not necessarily, the elements of the electrical circuit 120 are located on the surface 121 of the flexible substrate 101. The electrical circuit 120 includes at least an electrically conductive heater trace, thermal sensors, a programmable memory device, electrically conductive connective trace portions, and mounting and contact pads. The heater trace 124 defines a generally annular heater 126 surrounding a zone 130 of the substrate 101 into which no portion of the heater trace 124 extends; in this regard, the zone 130 is not directly heated when the heater operates. The zone 130 occupies a generally circular portion of the surface 121. More completely, the zone 130 is a cylindrical section of the substrate 101 which includes the portion of the surface 121 seen in FIG. 6, the counterpart portion of the opposing surface (not seen in this figure), and the solid portion therebetween. Preferably, but not necessarily, the zone 130 is centered in the center section 105 and is concentric with the heater 126. The first thermal sensor 140 is mounted on mounting pads formed in the zone 130. The second thermal sensor 142 is mounted on mounting pads disposed outside of the generally annular heater 126; preferably, these mounting pads are formed generally near the end of the tail 106, for example, in or near the center of the bulbous end 107 of the tail. In some constructions the programmable memory device 170 includes at least one multi-pin electronic circuit device mounted on the probe 44. For example the programmable memory device 170 can be constituted of an electrically-erasable programmable read/write memory (EEPROM) mounted on mounting pads formed on a portion of the surface 121 on the center section 105 near or adjacent the tab 108. The contact pads 171 are formed on the surface 121, in the tab 108. A plurality of conductive trace portions connects the first and second thermal sensors, the programmable memory device 170, and the heater trace 124 with a plurality of the contact pads 171. Preferably, but not necessarily, at least one contact pad 171 is shared by the programmable memory device 170 and one of the heater 126, the first thermal sensor 140, and the second thermal sensor 142.

As seen in FIG. 6, preferably, but not necessarily, the center section 105 has formed therein a plurality of slits 151, 152 to enhance the flexibility and conformability of the flexible substrate. The slits extend radially from the periphery toward the center of the center section 105. The slits define zones which move or flex independently of each other. The layout of the heater trace 124 is adapted to accommodate the slits. In this regard, the heater trace follows a zigzag or switchback pattern with legs that increase in length from the periphery of the zone 130 to the ends of the longer slits 151 and then, after a step decrease at those ends, generally increase in length again to the outer periphery of the heater 126 in the zones defined by the slits. As illustrated, the construction of the heater has a generally annular shape centered in the zone 130, although the annularity is interrupted by the slits. Alternatively, the annular shape can be viewed as including a peripheral annulus of wedge-shaped heater zones surrounding a generally continuous central annulus.

Preferably, but not necessarily, the heater 126 has a non-uniform power density construction that can be understood with reference to FIG. 6. In this construction, the heater 126 includes a central portion 128 (indicated by lightly drawn lines) having a first power density and a peripheral portion 129 (indicated by heavily drawn lines) which surrounds the central portion 128 and has a second power density higher than the first power density. The heater trace 124 is continuous and includes two ends, a first of which transitions to contact pad 5, and the second to contact pad 6. However, because of the slits, each of the central and peripheral portions 128 and 129 includes a plurality of sections arranged in a sequence, in which the sections of the central portion 128 alternate with the sections of the peripheral portion. Nevertheless, the annular structure of the heater arrays the sections of the central portion 128 generally in a central annulus around the zone 130, and arrays the sections of the peripheral portion 129 around the central portion 128. When the heater 126 is operated, the central portion 128 produces a central annulus of heat at the first power density surrounding the zone 130 and the peripheral portion 129 produces a ring-shaped annulus of heat at the second power density that surrounds the central annulus of heat.

The differing power densities of the heater portions 128 and 129 may be invariant within each portion; alternatively, they may vary. Variation of power density may be step-wise or continuous. Power density is most simply and economically established by the width of the heater trace 124 and/or the pitch (distance) between the legs of a switchback pattern. For example, the resistance, and therefore the power generated by the heater trace, varies inversely with the width of the trace. For any resistance, the power generated by the heater trace also varies inversely with the pitch of (distance between) the switchback legs.

Figure 7:
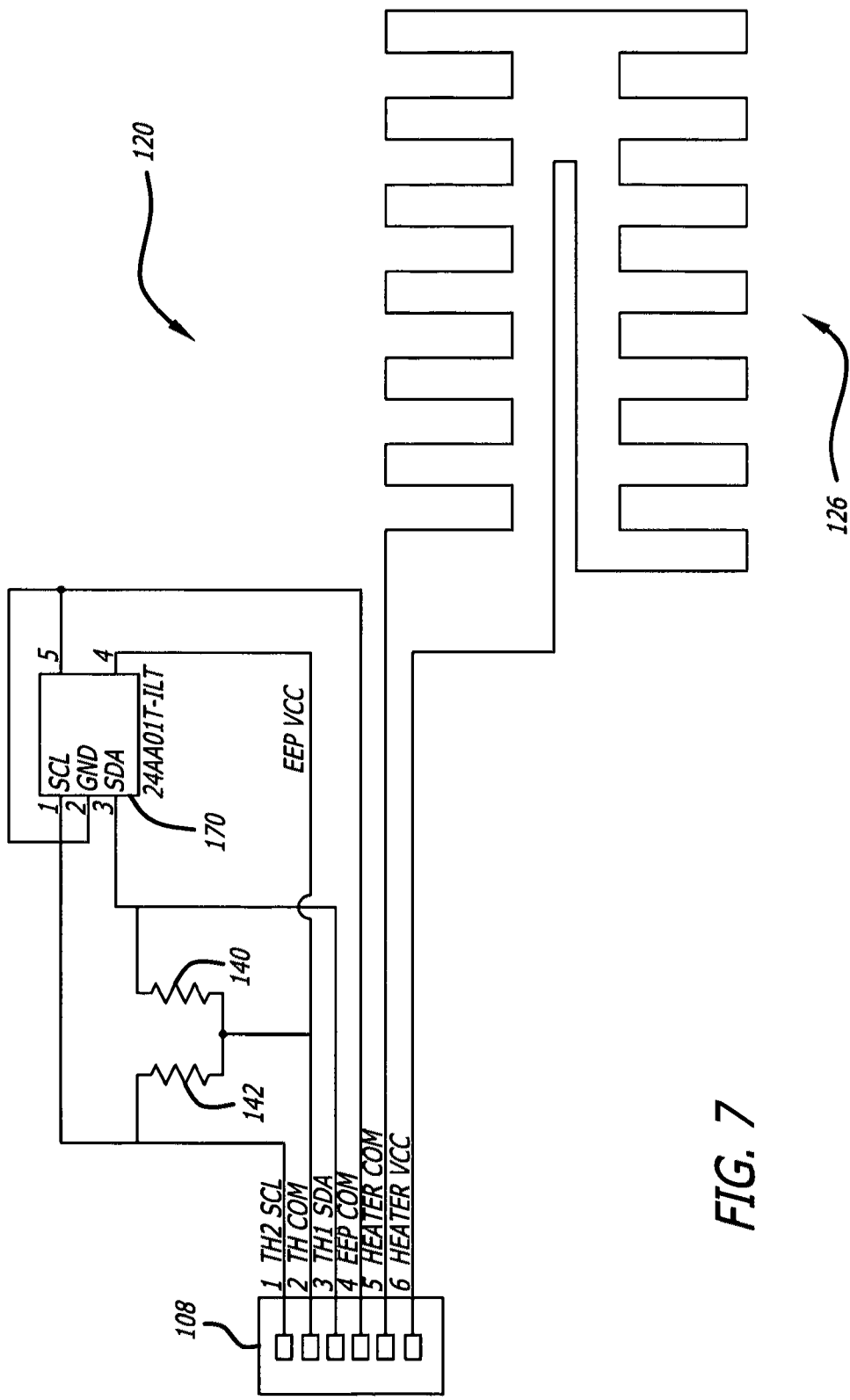
FIG. 7 is an electrical schematic diagram including elements of the probe construction of FIG. 6.

The electrical circuit 120 on the flexible substrate 101 seen in FIG. 6 is shown in schematic form in FIG. 7. The contact pads 171 on the tab 108 numbered 1-6 in FIG. 6 correspond to the identically-numbered elements in FIG. 7. The number of contact pads shown is merely for illustration. More, or fewer, contact pads can be used; any specific number is determined by design choices including the specific device configuration of the programmable memory device, the heater construction, the number of thermal sensors, and so on. In some constructions it is desirable to utilize one or more of the contact pads for electrical signal conduction to or from more than a single element of the electrical circuit 120 in order to minimize the number of contact pads, thereby simplifying the circuit layout, minimizing the size and mass of the tab 108, and reducing interface connector size.

Preferably, the programmable memory device 170 includes a multi-pin EEPROM mounted by mounting pads to the probe 44. FIGS. 6 and 7 illustrate a construction in which one or more contact pads are shared by at least two elements of the electrical circuit. In this regard:

one lead of the second thermal sensor 142 (TH2) and pin 1 of the programmable memory device 170 are connected by conductive trace portions to contact pad 1;

leads of the first and second thermal sensors 140,142 and pin 4 of the programmable memory device 170 are connected by conductive trace portions to contact pad 2;

one lead of the first thermal sensor 140 (TH1) and pin 3 of the programmable memory device 170 are connected by conductive trace portions to contact pad 3;

pins 2 and 5 of the programmable memory device 170 are connected by a conductive trace portion to contact pad 4;

the return end of the heater trace 124 is connected by a conductive trace portion to contact pad 5; and the input end of the heater trace 124 is connected by a conductive trace portion to contact pad 6.

With reference to FIGS. 4-6, when the probe 44 is assembled, the center section 105 and tail 106 are folded together about a flexible layer of insulating material such as the layer 102. The layer 102 provides thermal resistance and electrical insulation between the thermal sensors; it also supports the thermal sensors in a spaced-apart configuration. In other words, the first and second thermal sensors 140 and 142 are disposed on respective layers of substrate material that are separated by the layer of insulating material with the heater and first thermal sensor facing one side of the layer of insulating material and the second thermal sensor facing the other.

The probe 44, with the electrical circuit 120 laid out on one or more sides of the flexible substrate 101 as illustrated in FIG. 4, can be manufactured and assembled in the manner illustrated in the related applications, using materials identified in the Table of Materials and Parts. Preferably, the probe is constructed with a stiffener comprising a separate piece or a layer of material painted, deposited, affixed, or formed on the tab 108 and then hardened. The stiffener reduces the flexibility of the tab 108, thereby enabling it to be reliably coupled to and decoupled from a connector. Preferably, with reference to FIGS. 4 and 6, such a stiffener for the tab 108 is disposed on the outside surface of the flexible substrate 101 that corresponds to the second side of the flexible substrate 101.

Probe Design Considerations

Design and manufacturing choices made with respect to a zero-heat-flux DTT measurement probe can influence its operation. One design choice relates to the thermal sensors used in the detection of the zero-heat-flux condition. Given the importance of core body temperature, it is very desirable that the thermal sensors produce accurate temperature data in order to enable reliable detection of the zero-heat-flux condition and accurate estimation of core body temperature. In this case, the tradeoff is between accuracy and cost of the thermal sensor. A number of thermal sensor devices can be used in zero-heat-flux DTT measurement. These devices include PN junctions, resistive temperature devices, and thermistors, for example. Thermistors are a preferred choice for reasons of small size, handling convenience, ease of use, and reliability in the temperature range of interest. Their relatively low cost makes them desirable candidates for single-use, disposable probes.

The magnitude of a thermistor's resistance changes in response to a change of the temperature of the thermistor. Thus, to determine the magnitude of the temperature, the thermistor's resistance is measured and converted to a temperature value using a known relationship. However, batch-to-batch manufacturing differences can yield a large variance in thermistor resistance. For example, low-cost thermistors can exhibit a range of ±5% in resistance values from device to device at a given temperature, which yields a range of ±2.5° C. in reported temperature. A variance can compromise the accuracy and reliability of zero-heat-flux temperature measurement. Thus, while it is desirable to use such thermistors in order to limit the cost of parts and labor in manufacturing zero-heat-flux DTT probes, it is important to correct for the effects of resistance variance on device operation.

The range of thermistor resistance variance can be corrected by calibration of thermistor resistance using known methods, such as the Steinhart-Hart equation, which require knowledge of coefficients derived from values of thermistor resistance measured at fixed temperatures. When a thermistor is operated in its temperature measuring mode, the coefficients are used in known formulas to correct or adjust the magnitude of its indicated temperature. Such correction is called calibration.

System/Probe Signal Interface

Figure 8:
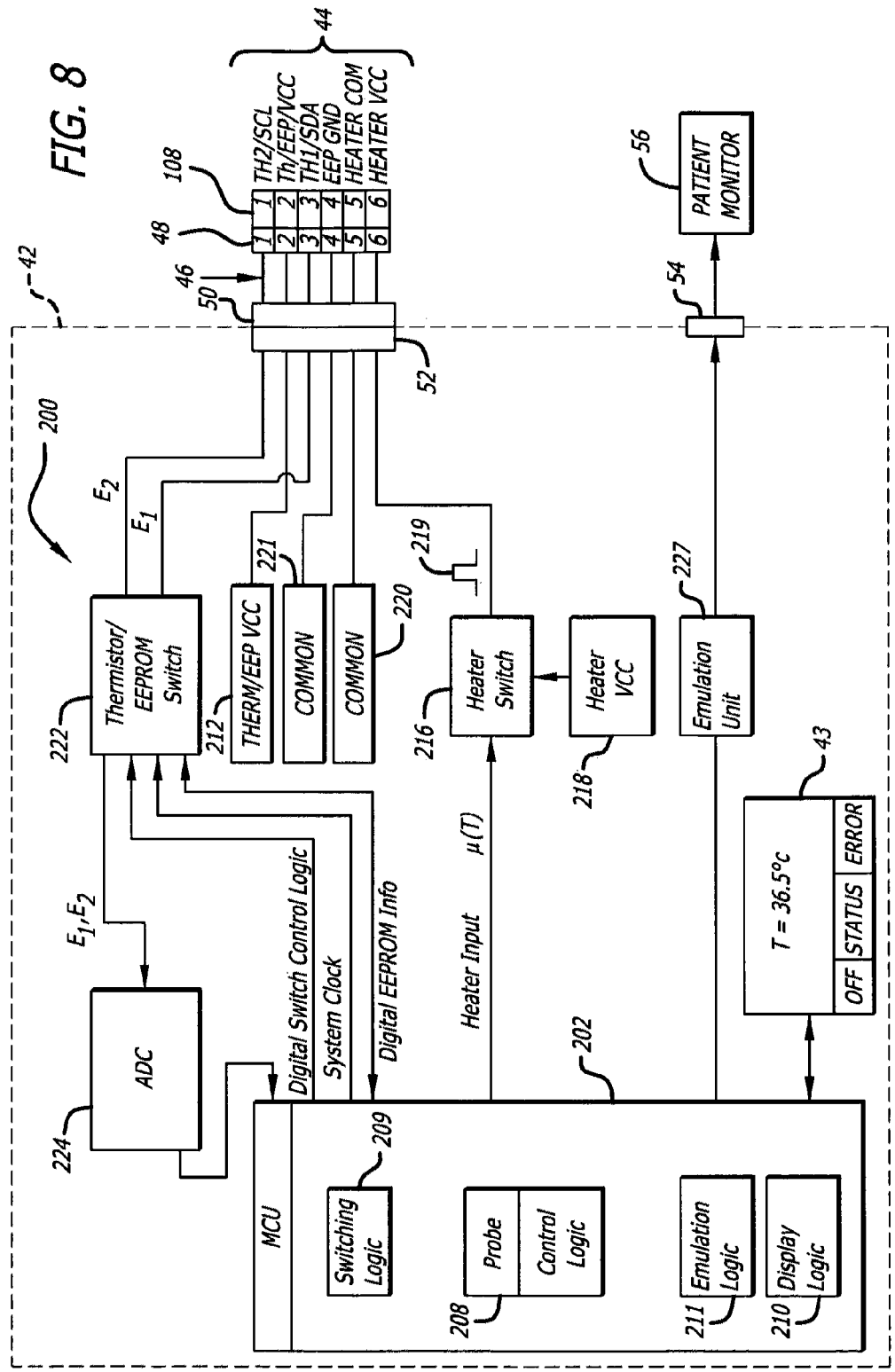
FIG. 8 is a block diagram illustrating elements of the zero-heat-flux DTT measurement system of FIG. 2.

The physical layout shown in FIG. 6 and the corresponding electrical circuit of FIG. 7 illustrate location of a probe signal interface connection on the tab 108; FIG. 8 illustrates a signal interface between the probe 44 and the measurement system 40 that is established by releasably connecting the connector 48 to the signal interface location on the tab 108. With reference to these figures, the system 40 includes controller 200 and a signal interface that transfers power, common, and data signals between the controller 200 and the probe 44. Preferably, the interface includes the cable 46 with the connector 48 releasably connected to the tab 108 and the connector 50 received in the signal connector jack 52.

Presuming that the programmable memory device 170 includes an EEPROM, a separate signal path is provided for EEPROM ground, and the thermal sensor signal paths are shared with various pins of the EEPROM as per FIGS. 6 and 7. This signal path configuration separates the digital ground for the EEPROM from the DC ground (common) for the heater, for good reason. Presume that the EEPROM and the heater share a contact pad for ground. The cable 46 including the contacts of the connector 48 has a certain amount of resistance. If the heater 126 is powered up, the current through it has to return to the controller 200 through the ground (common) contact, which means there will be some voltage developed on the probe side of the contact equal to the resistance of that line multiplied by the current through the heater 126. That voltage could be as high as 2 or 3 volts depending on the integrity of the contacts. If concurrently the supply voltage goes low on the EEPROM or even one of the logic lines goes low below this aforementioned generated voltage, the EEPROM would be reversed biased which could damage the part. Separating the heater and EEPROM grounds eliminates all these possibilities for damage to the EEPROM. Accordingly, it is desirable to electrically isolate the heater altogether from the other elements of the electrical circuit. Thus, as per FIG. 7, a first contact pad (contact pad 5, for example) of the plurality of contact pads is connected only to a first terminal end of the heater trace, while a second contact pad (contact pad 6, for example) of the plurality of contact pads is connected only to the second terminal end of the heater trace.

that Ø signifies diameter. Of course, these materials and dimensions are only illustrative and in no way limit the scope of this specification. For example, the traces may be made wholly or partly with electrically conductive ink. In another example, the thermal sensors are preferably thermistors, but PN junctions or resistance temperature detectors can also be used.

Table of Materials and Parts

| Element | Material/Part | Representative dimensions/characteristics |
|---|---|---|
| Flexible substrate 101, heater 126, contacts, and pads | 2 mil thick Polyethylene terephthalate (PET) film with deposited and photo-etched ½ oz. copper traces and pads and immersion silver-plated contacts. | Substrate 101: 0.05 mm thick |
| Thermal sensors 140, 142 | Negative Temperature Coefficient (NTC) thermistors, Part # NCP18XH103F03RB, Murata Electronics North America. | 10k thermistors in 0603 package. |
| Flexible insulating layers 102, 109 | Closed cell polyethylene foam with skinned major surfaces coated with pressure sensitive adhesive (PSA) | Insulator 102: Ø40 × 3.0 mm thick<br>Insulator 109: Ø40 × 1.5 mm thick |
| Stiffener | 10 mil thick PET film | Stiffener: 0.25 mm thick |
| EEPROM 170 | Micron Technology 24AA01T-I/OT | |

With reference to FIGS. 7 and 8, if the thermal sensors are NTC (negative temperature coefficient) thermistors, the common signal on contact pad 2 is held at a constant voltage level to provide Vcc for the EEPROM and a reference voltage for the thermistors. Control is switched via the thermistor/EEPROM switch circuit between reading the thermistors and clocking/reading/writing the EEPROM. Presuming again that the thermal sensors are NTC thermistors, the EEPROM has stored in it one or more calibration coefficients for each thermistor. When the probe 44 is connected to the system 40, the calibration coefficients are read from the EEPROM through the SDA port in response to a clock signal provided to the SCL port of the EEPROM. The following table summarizes an exemplary construction of the interface.

Table of Signals and Electrical Characteristics

| Element | Signals and Electrical Characteristics |
|---|---|
| Thermal sensors 140, 142 | Common reference signal is 3.3 volts DC. Outputs are analog. |
| Heater 126 | Total resistance 6.5 to 7.0 ohms driven by a pulse width modulated waveform of 3.5 volts DC. The power density of the peripheral portion 129 is 30%-60% higher than that of the center portion 128. |
| EEPROM 170 (Micron Technology 24AA01T-I/OT) | Ground is 0 volts. Vcc is 3.3 volts DC. SCL and SDA pins see a low impedance source switched in parallel with the thermistor outputs. Pin 5 (write protect) is held to ground in order to enable the device to be read from and written to when connected to the system. |

The probe can be fabricated using the materials and parts listed in the following table. An electrical circuit with copper traces and pads is formed on a flexible substrate of polyester film by a conventional photo-etching technique and thermal sensors are mounted using a conventional surface mount technique. The dimensions in the table are thicknesses, except Zero-Heat-Flux DTT Measurement System Control Mechanization With reference to FIG. 8, the zero-heat-flux DTT measurement system includes a controller 200 built on a standard self-contained, single chip microcontroller unit (MCU) 202 that includes CPU, program storage, data storage, clock generation and an array of logic and peripheral devices, all integral with the processing and display unit 42. The measurement system is constructed and operated for regulating a probe 44 and for providing an emulated thermistor output signal to the patient monitor 56. The various peripherals are connected to the MCU via appropriate interfaces. System software running on the MCU 202 includes logic for probe control, display, and emulation. The probe control logic calculates and reports skin temperature based on analog-to-digital (ADC) readings of the resistance of the two thermistors 140 and 142. It uses proportional-integral-derivative (PID) control to enable the heater to reach and maintain a zero-heat-flux condition while in STEADY state. The display logic manages the provision of temperature and system status information in a visual form by way of the LCD panel 43. The emulation logic generates a system output signal that simulates the operation of a standard thermal sensor.

As per FIG. 8, the controller 200 includes the MCU 202, probe control logic 208 and switching logic 209, display logic 210, and emulation control logic 211. Vcc is provided for the thermistors 140, 142 and the programmable memory device 170 from a Vcc source 212. A switch 216 is operated to power the probe heater 126 by providing Vcc 218 as a pulse-width-modulated (PWM) waveform 219; a heater common is provided at 220. A memory device common is provided at 221. An information switch 222 has a first state in which the analog signals generated by the thermistors 140 and 142 are routed from contact pads 1 and 3 to ADC 224. A second state of the information switch 222 decouples the ADC 224, and couples a system clock (SCL) waveform to the programmable memory device 170 through contact pad 1. This permits data to be read from and written to the programmable memory device 170 by way of a serial data (SDA) pin of the memory device 170, through contact pad 3.

With further reference to FIG. 8, the probe control logic 208 exercises read/write access to the programmable memory device 170 on the probe 44. The probe control logic 208 reads temperature data, probe authentication information, temperature and use histories, and calibration data from the probe, calculates temperature values, performs heater control calculations, exercises control over the operational state of the probe 44, and communicates with a system operator by way of the LCD panel 43. The probe control logic also writes information, including temperature history, probe use, and calibration data to the programmable memory device 170.

FIG. 8 shows voltage signals $E_1$ and $E_2$ obtained from the thermistors 140 and 142 that are used to calculate skin and heater temperatures sensed by the thermistors. FIG. 8 also shows a heater control signal u(T) used to control the amount of heat produced by the heater 126. With the switch 222 in the first state, the thermistor voltage signals $E_1$ and $E_2$ are read by the probe control logic 208 and converted to obtain heater and skin temperature values $T_h$ and $T_s$. The probe control logic 208 uses the heater and temperature values in a PID control algorithm that determines a magnitude of the heater control signal u(T). $E_1$ and $E_2$ are read in succession; preferably, each value is sampled at a predetermined rate (30 Hz, for example) and the average of the samples for each parameter is used. The magnitudes of resistances $R_1$ and $R_2$ for the thermistors 140 and 142 are calculated using the values measured for $E_1$ and $E_2$. Then, using calibration information read from the programmable memory device 170 for each thermistor, values of the heater and skin temperature parameters are calculated. Preferably, but without limitation, the thermistor readings are calculated using a Steinhart-Hart algorithm and calibration coefficients A, B, and C read from the device 170. Alternatively an R vs. T lookup table or other linear approximation for T(R) can be used to obtain calibrated values of heater and skin temperatures. An error value $\epsilon(i)$ is calculated as the difference between heater and skin temperatures (that is to say, the difference between the temperature sensed by thermistor 140 and the temperature sensed by the thermistor 142), and is used in the PID control algorithm to calculate u(T).

With further reference to FIG. 8, the signal u(T) is a digital number having a value that ranges from zero to a maximum value. The value causes the heater switch 216 to modulate the pulse width of the Vcc waveform 219 provided to the heater, from zero, where the heater is effectively turned off, to max, where the heater is continuously on. Preferably, but not necessarily, in order to ensure safe operation of the heater 126, the pulse width is limited to 90% in a PREWARMING mode of operation, and to 40% in an EQUILIBRATION mode of operation. While in error free operation, the heater 126 is not on continuously. Preferably, but not necessarily, in order to ensure safe operation of the heater 126, the PID runs every second and outputs the heater PWM signal 219 in 0.1% increments (which is the same as the milliseconds necessary to run given a one-second duty cycle). It should be noted that we do not intend to limit the control mechanization of the heater 126 to PWM methods. In fact those skilled in the art will appreciate that heater power can be controlled by other modes, including, but not limited to continuous wave modulation.

With further reference to FIG. 8, the MCU 202 operates the display logic 210 to control the visual interface between the controller 200 and a system operator. In this regard, the display logic obtains an image from an MCU memory (not seen), colorizes it as needed, and puts it on the LCD panel 43. Text is rendered using a variety of fonts. A temperature history graph is built using data sensed by a probe. For example, a state machine (described below) sends a command to the display logic 210 to put a measured temperature on a STEADY state screen (for example, 36100 mC). The display logic 210 translates this into Fahrenheit if necessary. Then it translates the number from a fixed-point number (in mC) to a floating-point representation in a text string ("36.1"). A particular font and MCU memory location are always used to represent the main temperature in Celsius.

Figure 9:
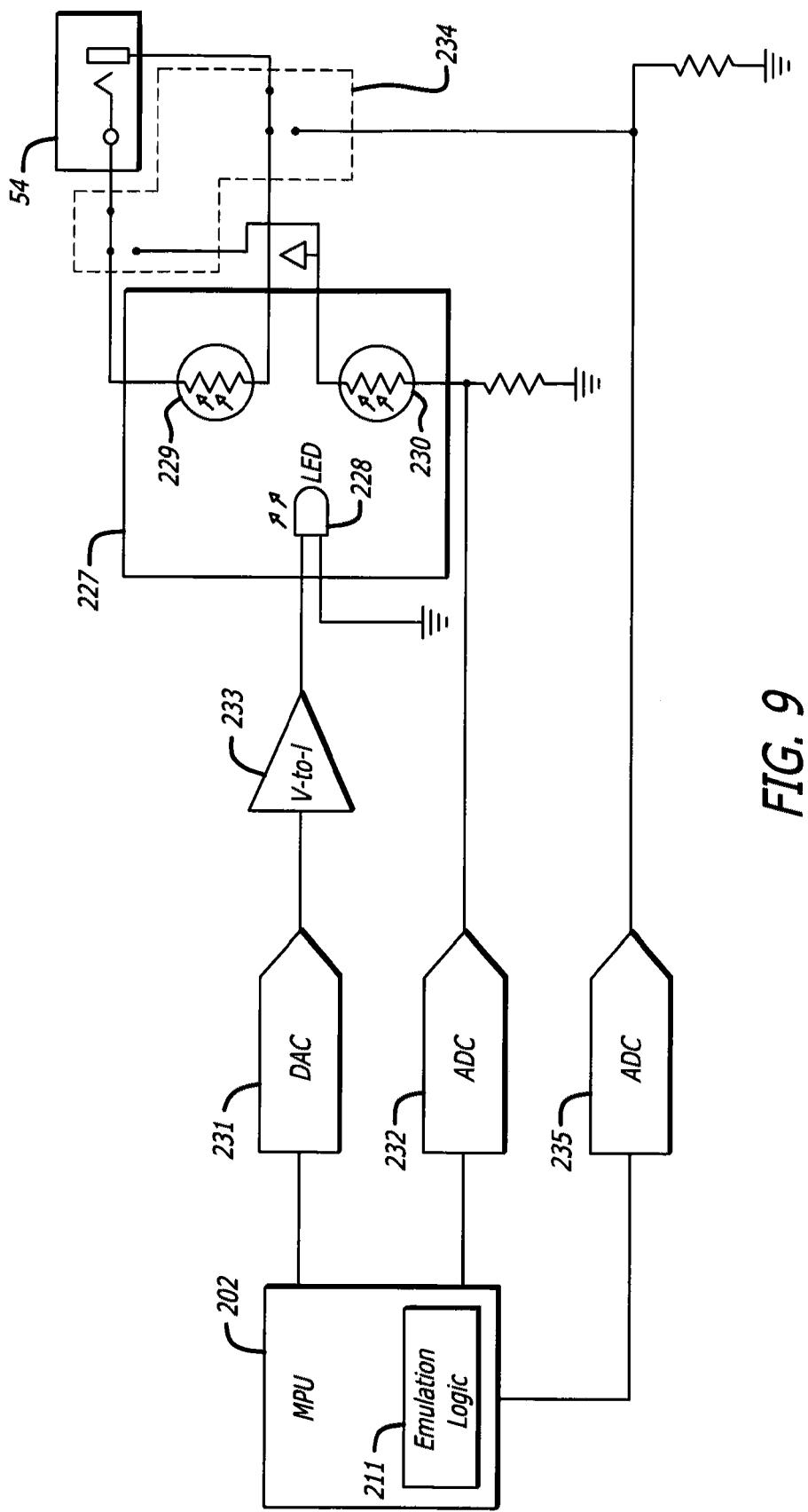
FIG. 9 is a partial electronic schematic diagram illustrating an emulator for generating an output signal conforming to a standard input signal configuration for a patient monitor.

With reference to FIGS. 8 and 9, the MCU 202 includes emulation control logic 211 that controls the operation of an emulation unit (EMU) 227. The EMU 227 is operative to produce an output signal at an output jack 54 that conforms to a common signal interface for electronic medical equipment such as a patient monitor. Preferably, but not necessarily, the output signal mimics the characteristics of a resistive thermistor. In some aspects, but without limitation, the EMU imitates the resistance of a negative-temperature-characteristic (NTC) YSI-400 thermistor. In this regard, the process of emulation converts a skin temperature measured by the measurement system 40, via a probe 44, to a resistance value that would be produced by a YSI-400 thermistor in response to the same temperature. In operation, the emulation logic 211 obtains a value of $T_s$ and provides the value to the emulation unit 227. The emulation unit (EMU) 227 converts the temperature value to the corresponding YSI-400 thermistor resistance value and provides the resistance value through the output jack 54.

The YSI-400 thermistor signal is accepted as input by many patient monitors. The measurement system 40 emulates this output signal by driving the EMU 227 to provide a resistance value from the YSI-400 calibration chart equivalent to the DTT temperature. In this fashion, any monitor that accepts YSI-400 output will also accept output from the measurement system 40.

With reference to FIG. 9, the EMU 227 is a thermistor emulation system that utilizes a light-dependent resistor 229 illuminated by a microprocessor-controlled light source 228 to provide a high degree of compatibility with the emulated YSI-400 thermistor, and high galvanic isolation of the zero-heat-flux DTT measurement system 40. In this regard, the light source 228 is constituted as a light emitting diode (LED), and the light-dependent resistor 229 is an output photocell. Preferably, the photocell 229 is paired, or associated with, a reference light-dependent resistor 230, also constituted as a photocell; preferably, but not necessarily, the photocells 229 and 230 are matched. The LED 228 is positioned to illuminate both light-dependent resistors 229, 230 under control of the emulation control logic 211. Each of the photocells 229, 230 exhibits a resistance value inversely proportional to an intensity of light output by the LED 228, which corresponds to the temperature-responsive operation of an NTC thermistor. The photocell 229 provides an emulation signal in response to the level of illumination. The photocell 230 allows closed-loop regulation of the photocell 229 by the MCU 202. Preferably, but not necessarily, the EMU 227 is an integrated opto-electronic device such as the optocoupler made and sold by Perkin-Elmer under the product name LT2015-1.

In operation, the LED 228 converts the skin temperature value to light of an intensity that causes the resistance of the output photocell 229 to equal the resistance of a YSI-400 thermistor held at the same temperature. Light from the LED 228 also impinges on the reference photocell 230. The EMU 227 controls the intensity of the LED 228 based on resistance of the reference photocell 230 to correct for small variations in LED output and photocell sensitivity. The emulation logic 211 exercises control over the EMU 227 by way of a digital-to-analog converter (DAC) 231 and an analog-to-digital (A/D) converter 232 (ADC). Based on the current value of $T_s$, which is stored in digital form by the controller 200, the emulation logic 211 generates an LED drive signal. The drive signal has a magnitude that causes the LED 228 to emit light of such intensity as will cause the output photocell 229 to assume the resistance value that would be produced by the emulated thermistor in response to $T_s$. The drive signal is converted from digital to analog form by DAC 231; a voltage-to-current converter 233 generates a current from the analog voltage produced by the DAC 231 that is applied to the LED 228. In order to confirm that the resistance value produced by the output photocell 229 is correct, the emulation logic 211 reads the resistance value of the reference photocell 230 via the ADC 232 and makes any necessary corrections by adjusting the LED drive signal. An EMU calibration circuit includes an output switch 234 that is controlled by the emulator logic 211 for the purpose of periodically rerouting the EMU output produced by the output photocell 229 to an ADC 235. This allows the initial calculation and periodic recheck of the conversion table (below).

The emulation logic 211 operates in response to a state flow that includes at least four states. In an OFF state, the switch 234 is operated to open the circuit to the patient monitor 56 so that the resistance is effectively infinite. In an ON state, the switch 234 closes the output circuit so that the patient monitor 56 can measure the resistance of the output photocell 229. In this state, the emulation logic 211 uses the values from the conversion table, below, to regulate the intensity of LED 228 with the aim of providing a desired output resistance value. In a COARSE CALIBRATION state, the switch 234 opens the circuit to the patient monitor 56 and closes the circuit to the ADC 235. The emulation logic 211 then constructs a coarse approximation of a conversion table. In a FINE CALIBRATION state, the switch 234 opens the circuit to the patient monitor 56 and closes the circuit to the ADC 235. The emulation logic 211 then corrects the conversion table for any errors that may have occurred since the coarse calibration was done.

The EMU 227 is operated by the emulation logic 211 with reference to a conversion table, an example of which is presented below. It is understood that the values in the table need not be perfect, but rather are held to within an acceptable degree of error. The first column of the conversion table represents DTT temperature at ZHF. The second column (YSI 400 Value) contains the target resistance value (in ohms) associated with the temperature in column 1. The third column (Emulation Photocell Output) provides an ADC setting taken from the photocell 229 during coarse calibration such that the resistance value of the emulation output photocell 229 taken at the EMU output jack 54 matches the YSI 400 value from column 2. The fourth column (Reference Photocell Output) provides an ADC setting taken from the reference photocell 230, which is associated with the Emulation Photocell Output setting in column 3.

EMU Conversion Table

| $T_s$ (° C.) | YSI 400 value (Ω) | Emulation Photocell 229 Output (ADC counts) | Reference Photocell 230 Output (ADC counts) |
|---|---|---|---|
| 25 | 2252 | 1532415 | 1537497 |
| 26 | 2156 | 1582938 | 1580443 |
| 27 | 2064 | 1682938 | 1623606 |
| ... | ... | ... | ... |
| 44 | 1023 | 3007281 | 2353167 |

In the ON state, the emulation logic 211 receives the current temperature value from within the MCU 202. Then the two temperature values in the table closest to the current temperature value are determined. The emulation logic then interpolates a target ADC value for the reference photocell 230. The DAC 231 is initially set to a mid-point setting after coarse calibration. DAC 231 drives the LED 228, which in turn illuminates both the output photocell 229 and the reference photocell 230. The output of the reference photocell 230 is then checked against the interpolated ADC target value via the ADC 235. If the value is different, the DAC 231 setting which drives the LED 228 is adjusted until the actual reference photocell output is the same as the interpolated target value. Once zeroed in, the DAC value continues to be updated so that the ADC 235 value tracks the target ADC value. This process is repeated on periodic basis to accommodate changes in the current temperature as well as changes in LED output and photocell response.

The COARSE CALIBRATION state occurs each time a probe is attached to a patient. First, the emulation logic 211 incrementally changes the illumination produced by the LED 228, running through a broad range of possible values. At regular intervals, the emulation logic 211 attempts to reach an LED power such that the resistance value of photocell 229 achieves the YSI 400 value associated with a target temperature (e.g., 25° C.). When this condition is achieved, the associated LED setting and reference photocell output are recorded in their respective columns in the conversion table. The logic 211 increments the LED and repeats the process until the conversion table is fully populated.

The FINE CALIBRATION state occurs periodically, with an interval chosen to be shorter than the time required for meaningful drift in the LED and photocell outputs. The emulator logic chooses the LED setting for a single target temperature based on the current temperature of the system. (e.g., 37.5° C.). Then, the resistance value of the reference photocell 230 is compared to the actual resistance value of output photocell 229. The difference is used to set a fixed offset that is used to compensate the reference photocell in order to eliminate the error on the output photocell.

The controller 200 can be assembled using parts listed in the following table. Of course, these parts are only illustrative and in no way limit the scope of this specification.

Table of Controller Parts

| Element | Part |
|---|---|
| MCU 202 | NXP LPC1313FBD48, 151 |
| LCD Display Panel 43 | Varitronix, COG-T240V6080-02 r1, 240 × 320 TFT, 25 kHour backlight |
| Heater Switch 216 | ZXM61P03FTA |
| Thermistor/EEPROM Switch 222 | TS5A23159DGSR |
| EMU 227 | Perkin-Elmer Optocoupler LT2015-1 |
| DAC 231 | MCP4725A1T-E/CH |
| ADC 224, 232 | TI ADS1224IPWT |
| V-to-I 233 | TI TLV271IDBVR |

Zero-Heat-Flux DTT Measurement System Operation

The zero-heat-flux DTT measurement system 40 is constructed to measure deep tissue temperature in an orderly and directed manner in response to conditions it perceives and commands input to it by a system operator. The controller 200 of the system 40 governs the operations of the system 40 and the functions of the probe 44 connected to it, and processes data obtained from the probe in order to format it for control of the heater 126, for output (via the display panel 43 and the EMU 272), and for storage in the programmable storage device (hereinafter, the EEPROM) 170. FIGS. 10A-10K illustrate a method of operation performed by the controller in order to obtain one or more deep tissue temperature measurements. FIGS. 11A-11M illustrate information output by the controller during execution of the method. The information is provided by way of the display panel 43, and each instance of information is referred to as a "screen" in the description that follows.

Figure 10A:
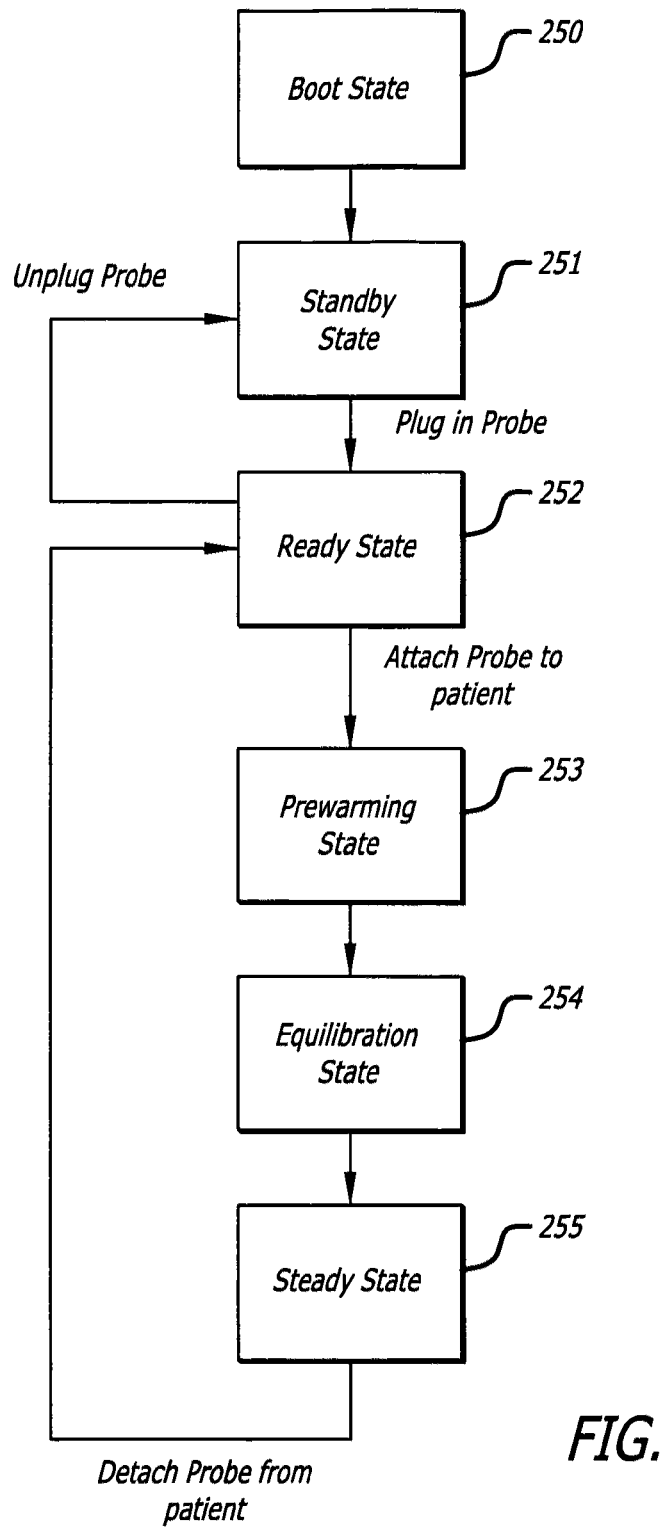
FIG. 10A is a state diagram illustrating machine states of the zero-heat-flux, DTT measurement system of FIG. 2.
Figure 10E:
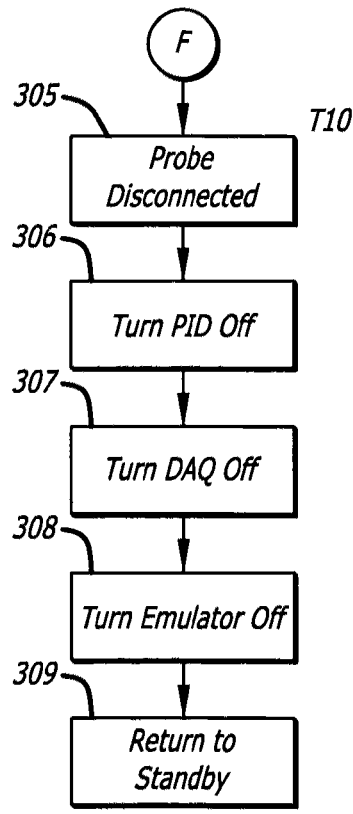
Figure 11A:
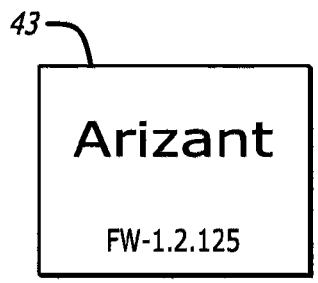
Figure 11B:
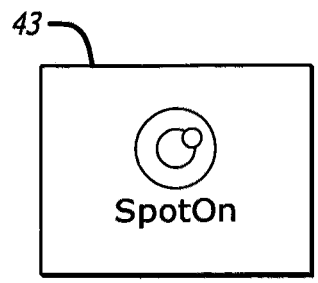
Figure 11C:
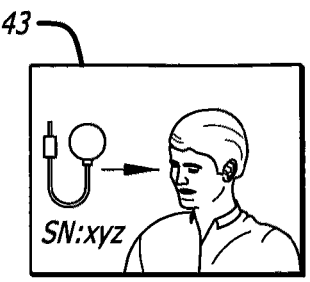
Figure 11D:
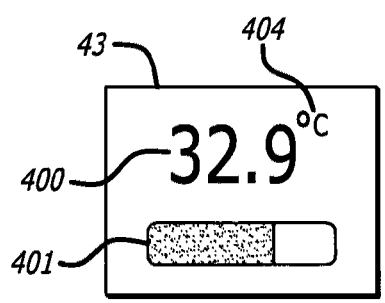
Figure 11E:
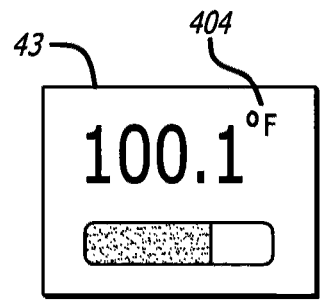
Figure 11K:
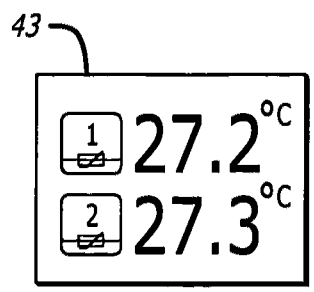
Figure 11L:
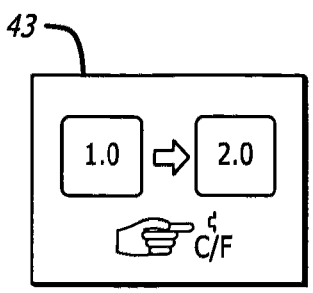

FIG. 10A is a state transition diagram that illustrates a sequence of machine states through which the zero-heat-flux DTT measurement system 40 transitions to obtain measurement of deep tissue temperature. Although a specific state sequence is shown, many other transitional states, operational steps, and fault conditions are possible during the operation to be described. When first powered up, the system 40 enters a BOOT state 250. At this time, a boot screen (FIG. 11A) is output on the display panel 43. When fully booted up, the system 40 enters a STANDBY state 251, where it awaits the presence of a probe 44. At this time, a standby screen (FIG. 11B) is displayed. When the system operator has plugged a probe 44 into the connector 48 of the signal interface cable 46, the system enters a READY state 252, indicated by a ready screen (FIG. 11C). Once a probe 44 is attached to a patient, the system 40 performs several sequential steps. First, the probe 44 is preheated by means of the heater 126 to somewhat above a transient skin temperature, which is not the core temperature, to accelerate equilibration. This operational condition, which may last for several minutes, is referred to as a PREWARMING state 253. Upon completion of prewarming, the system 40 attempts to cause equilibration between the skin thermistor 142 and the heater thermistor 140 using PID control. This operational condition, which may take an additional 3-5 minutes, is referred to as the EQUILIBRATION state 254. During both the prewarming and equilibration states, an equilibration screen is displayed (FIG. 11D or 11E). On the equilibration screen of FIG. 11D, the current temperature measured by the skin thermistor 142 is displayed, but is flashing and color-coded to show that the final temperature has not yet been reached. The screen also includes a progress bar 401, which shows approximate progress of the equilibration process. In addition, the screen indicates whether the measurement is in Celsius (FIG. 11D) or Fahrenheit (FIG. 11E). When equilibration is attained, the system 40 enters a normal STEADY state 255, indicated by a steady screen (FIG. 11F or 11G). The steady screen shows the current temperature of the skin thermistor 142, as well as whether the reading is in Celsius (FIG. 11F) or Fahrenheit (FIG. 11G). In addition, the steady screen shows a bar graph of patient temperature readings from the recent past. Preferably, but not necessarily, each bar comprises the average reading of a five minute interval and has sufficient space to show up to two hours of overall time. The patient temperature is referenced to a line indicating 36° C., a widely accepted threshold for hypothermia in humans. If the patient temperature falls below this value, the color of the bar changes, for example, from white to blue, further highlighting the patient's condition. The patient's temperature data are written to the EEPROM 170 on the probe 44, and since it is possible to unplug the probe 44 for some period of time, it is possible for the record of temperature to include gaps. Such gaps are shown with the absence of a single bar in the chart (408 in FIG. 11H), regardless of duration. Although not shown in FIG. 10A, it is possible to enter an error state due to one or more conditions. For example, a first error state is a system error state, indicated by a system error screen (FIG. 11I). For another example, a second error state is a probe error state, indicated by a probe error screen (FIG. 11J). Either type of error state interrupts operation of the system. However, once system operation is interrupted, different resolution actions are indicated. In this regard, a probe error can be resolved by unplugging the probe; however a system error is usually not resolvable by the system operator. any transition from one state to a succeeding one of the states 252, 253, 254, and 255 directs the program flow to stream F, which continues in FIG. 10E.

FIGS. 10B-10K illustrate a method by which the controller 200 operates the measurement system 42 to measure deep tissue temperature with the probe 44 connected to the system 40. These figures, and the accompanying explanation, presume appropriate programming of the MCU 202. Accordingly, unless otherwise indicated, the steps or acts that are illustrated and described are "controller-executed" steps, or are steps executed by a zero-heat-flux DTT measurement system.

Figure 10B:
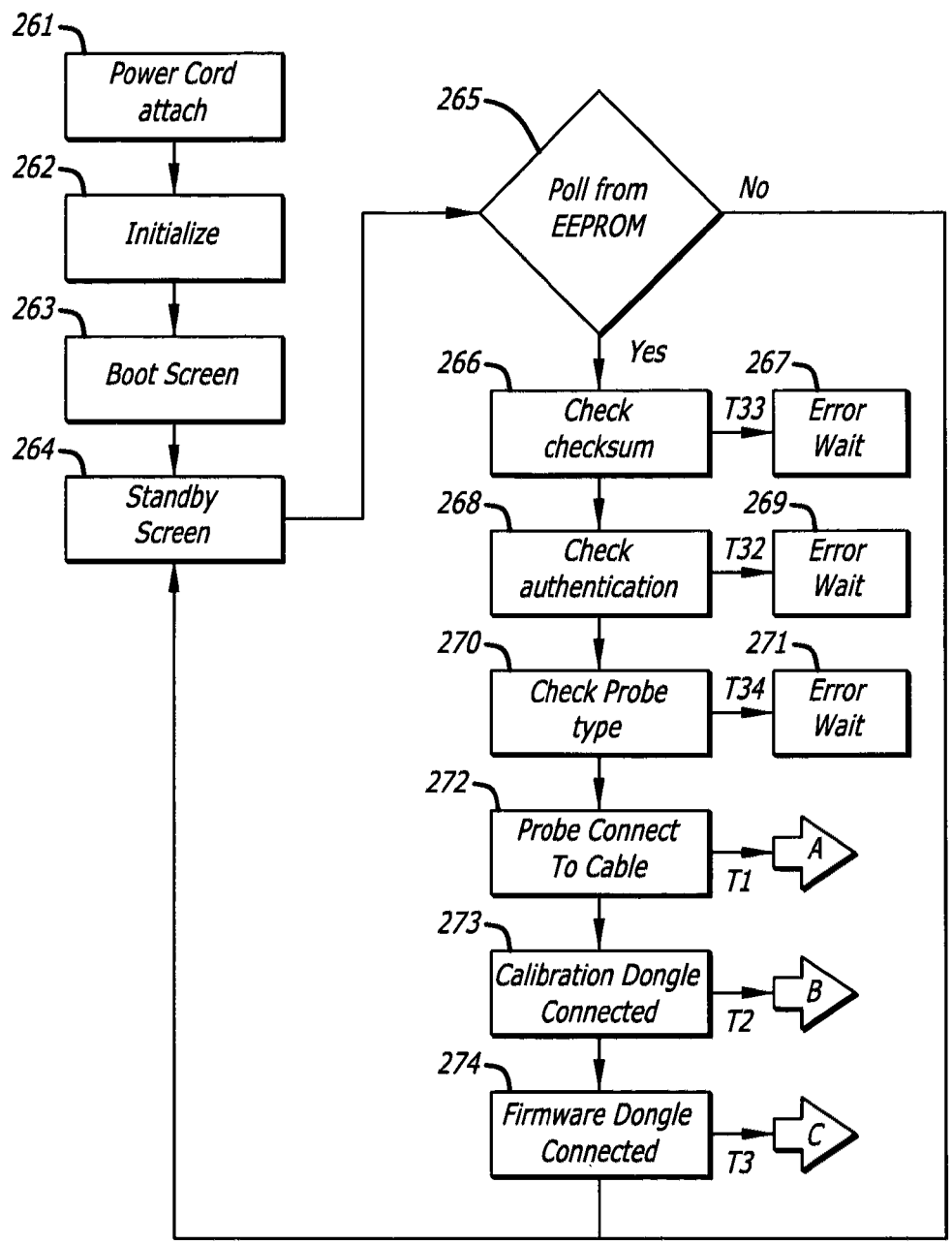
FIGS. 10B-10K together form a flow diagram illustrating a method by which the zero-heat-flux, DTT measurement system of FIG. 2 is operated.
Figure 10C:
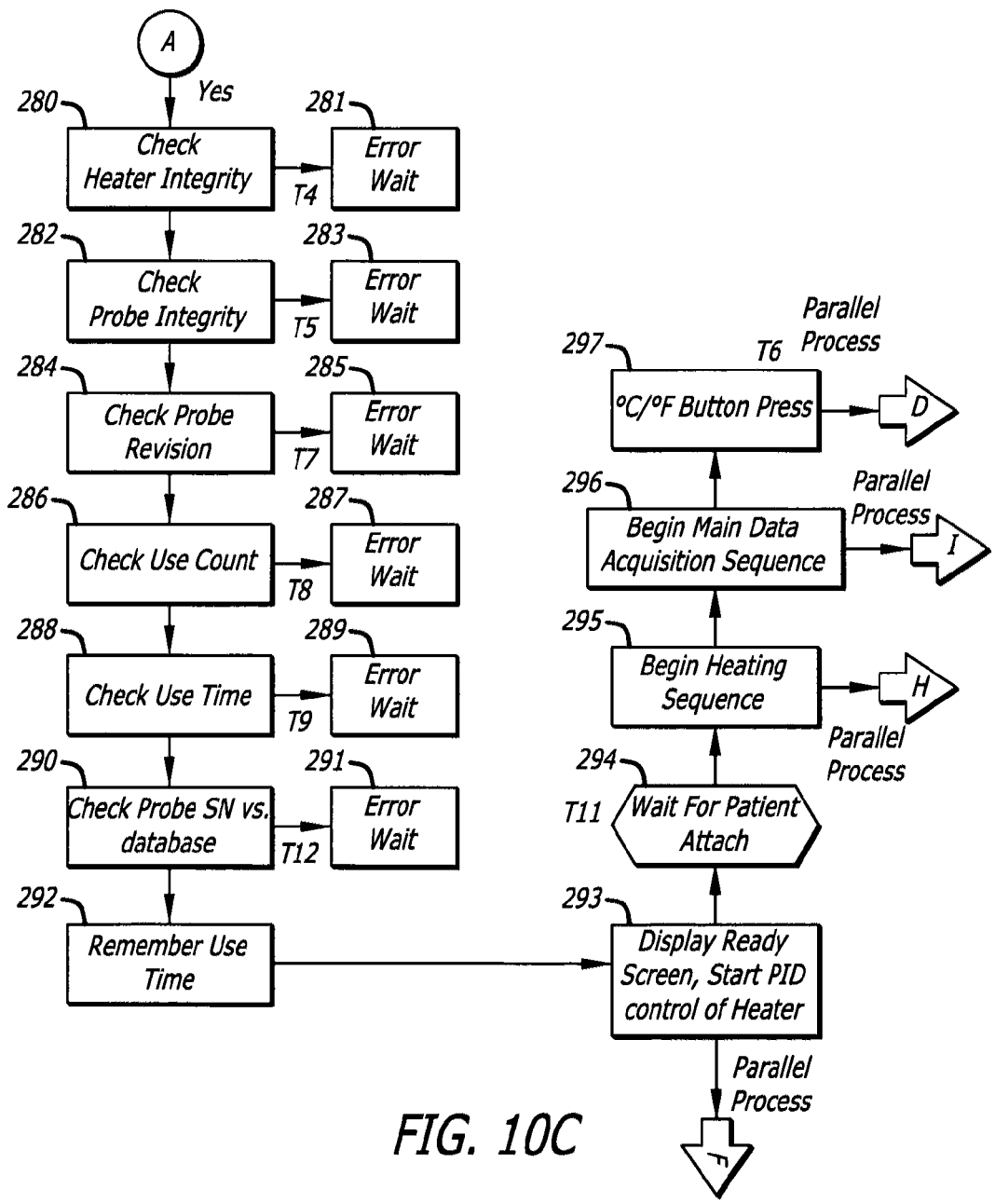
Figure 10D:
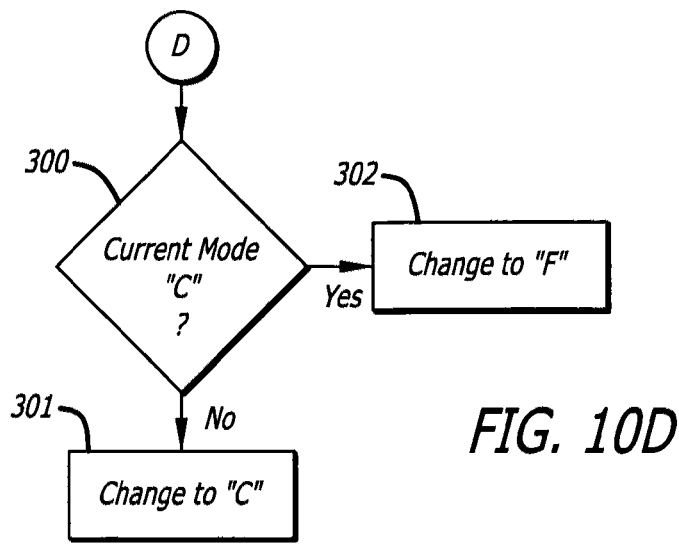
Figure 10F:
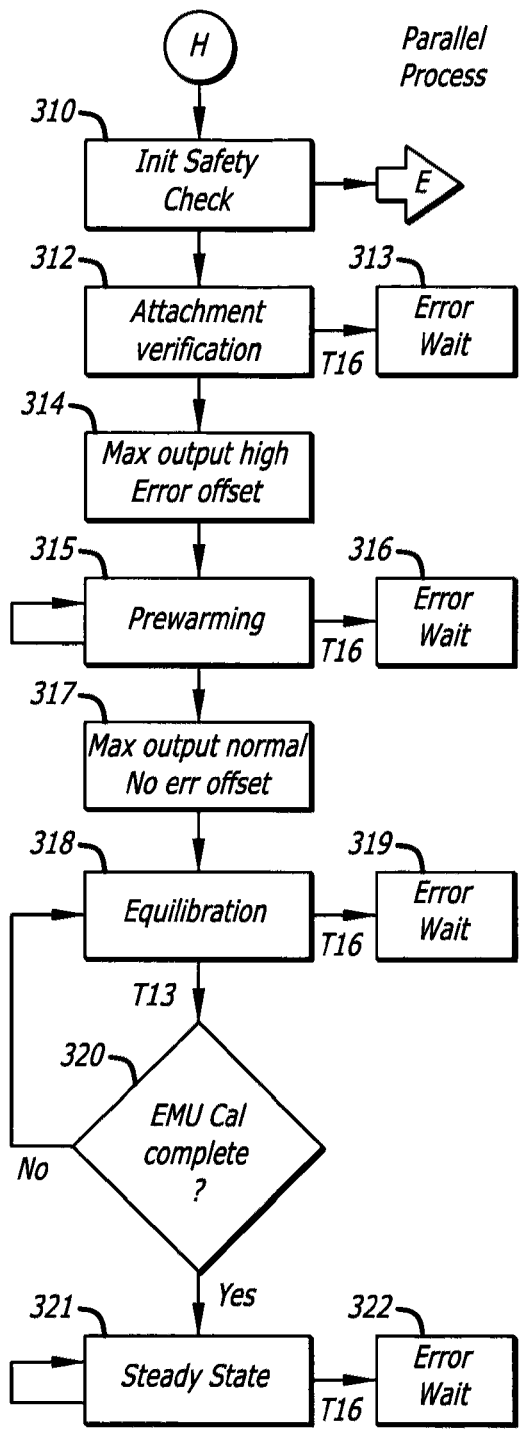
Figure 10G:
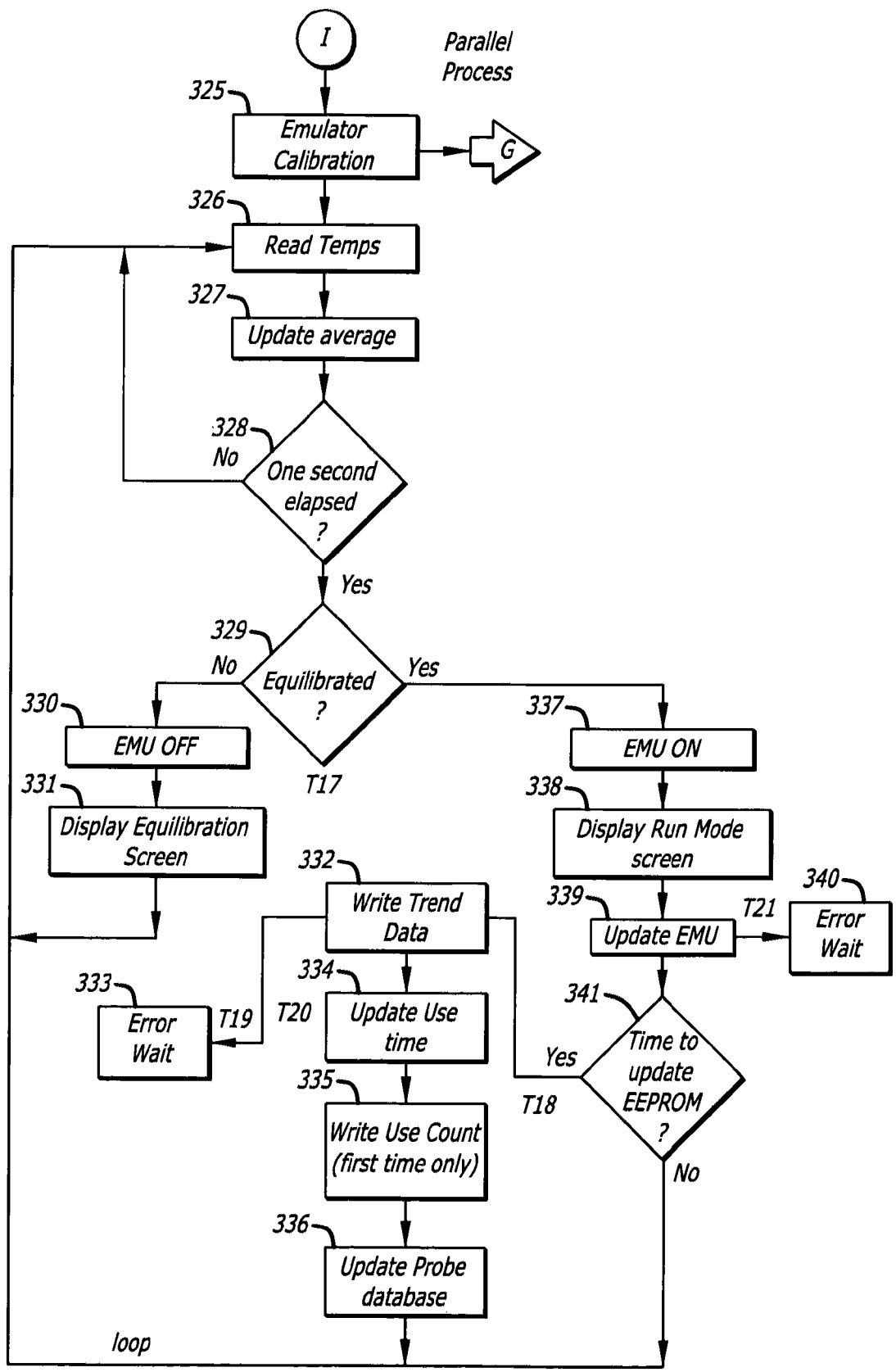
Figure 10H:
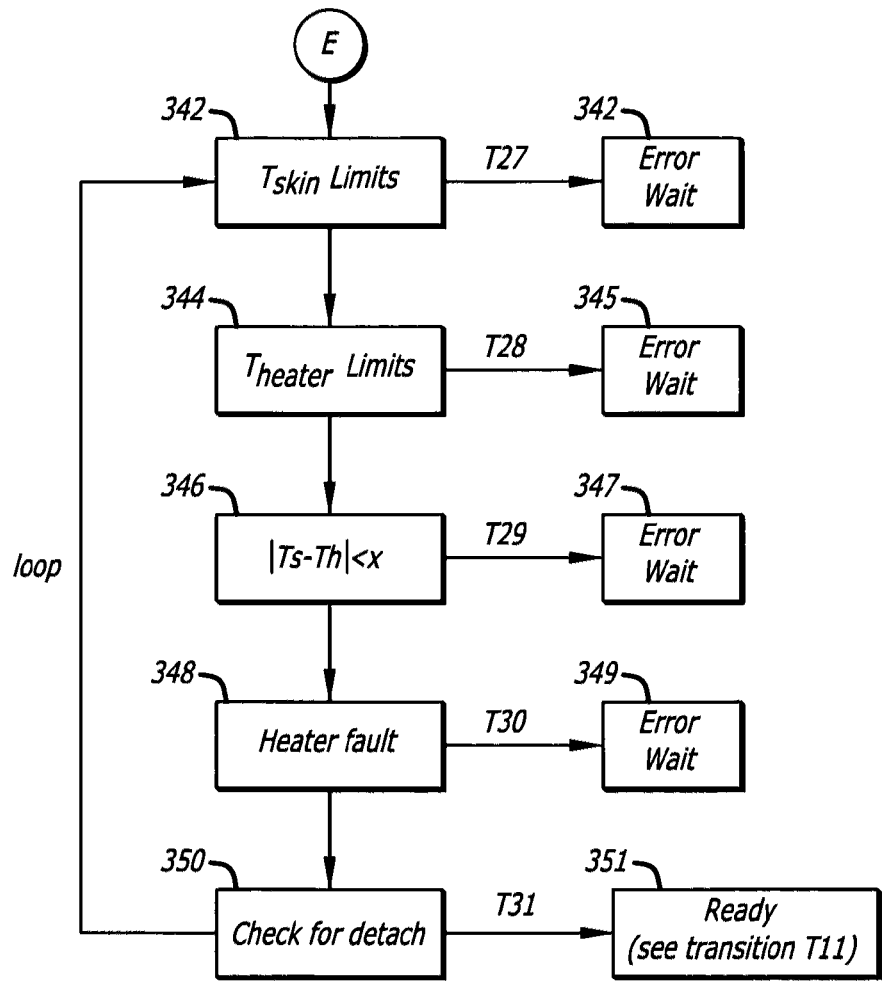
Figures 10I, 10J:
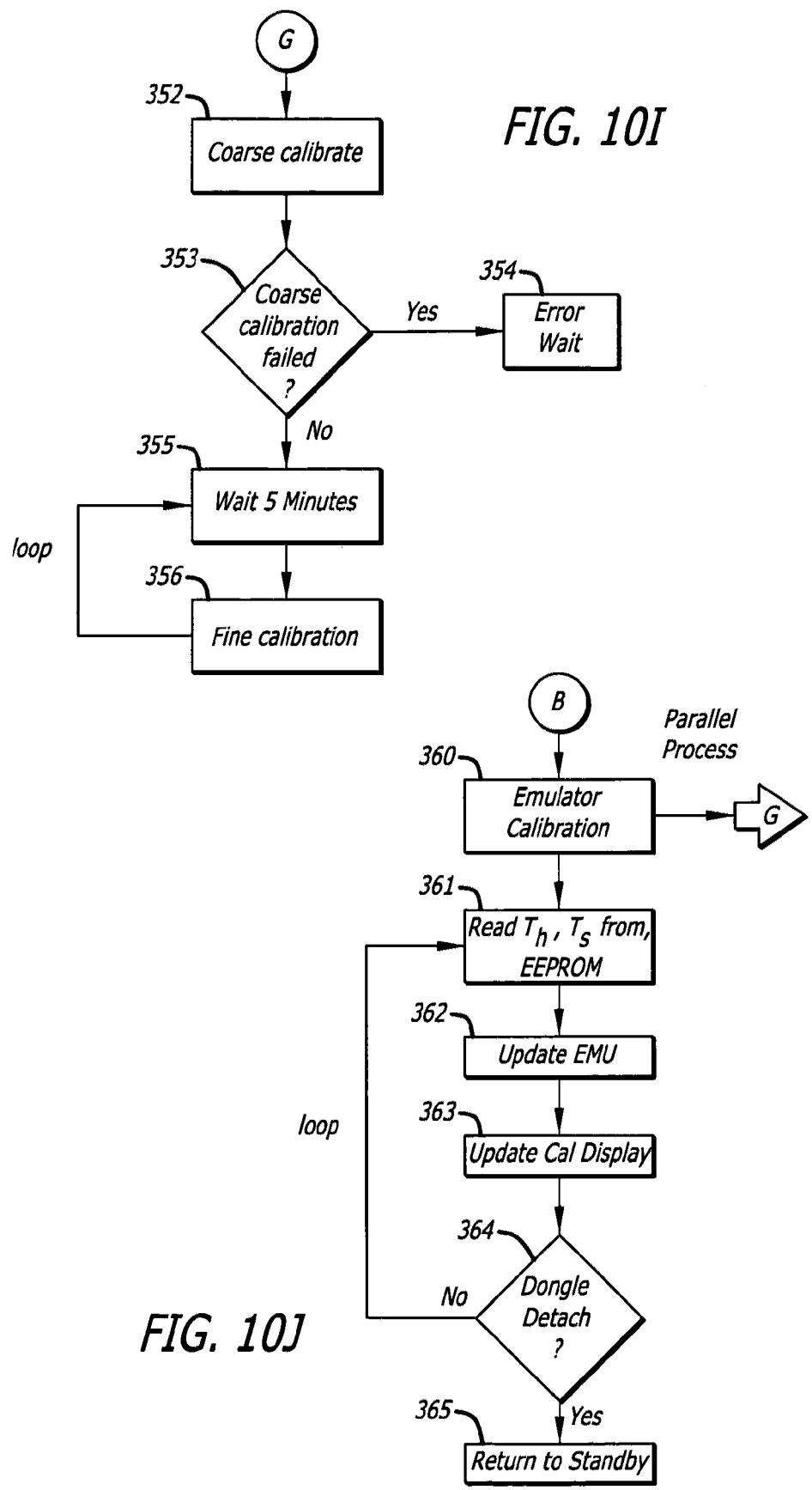
Figure 10K:
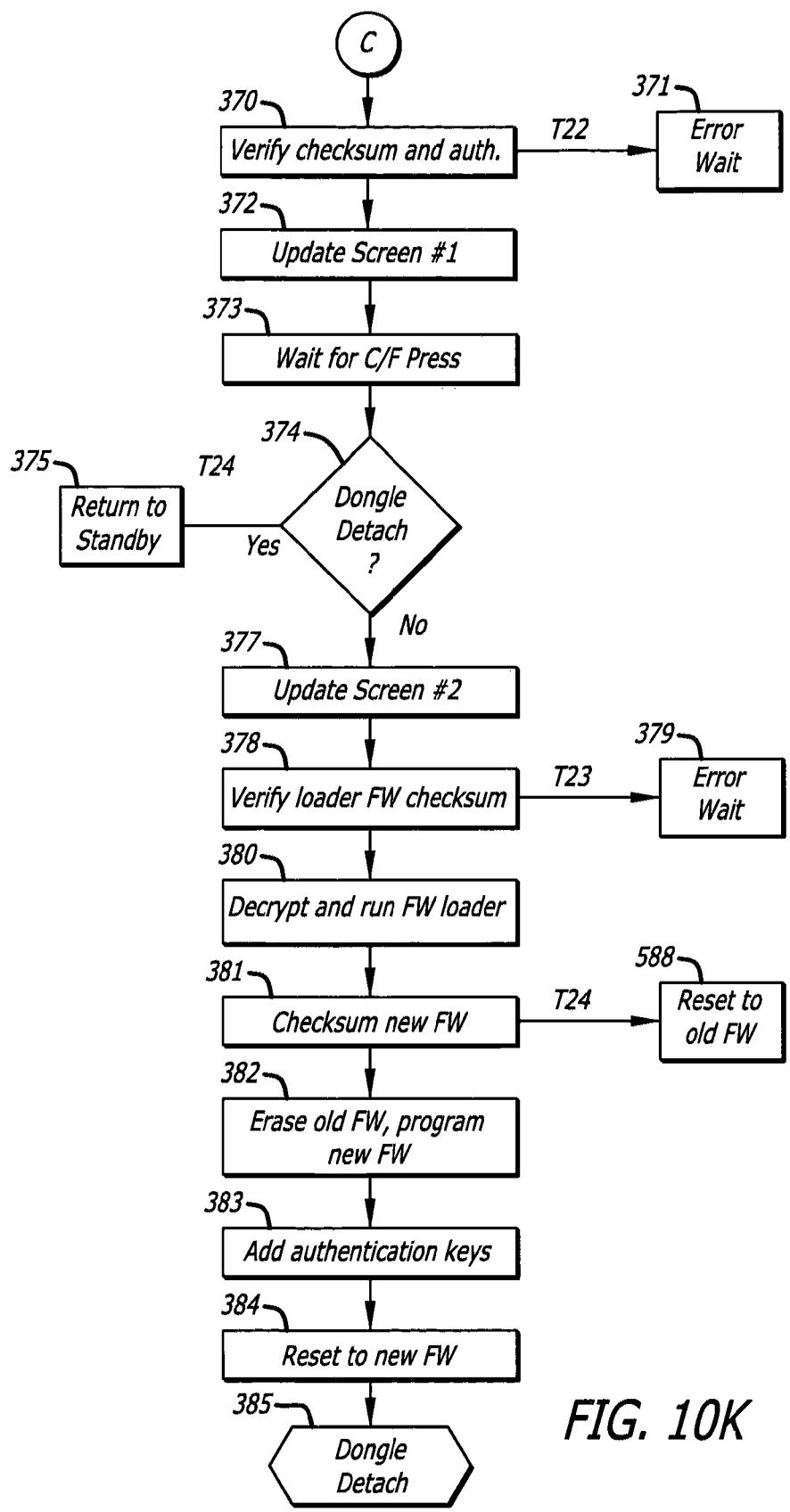

A method of deep tissue temperature measurement which is executed by the MCU 202 running the probe control logic 208 begins in FIG. 10B, which illustrates a main control loop for the system 40. FIG. 10C shows a probe connection sequence. FIG. 10D shows a Celsius/Fahrenheit change sequence. FIG. 10E shows a probe disconnection sequence. FIG. 10F shows a heater control sequence. FIG. 10G shows a data acquisition sequence. FIG. 10H shows a safety check sequence. FIG. 10I shows an EMU calibration sequence. FIG. 10J shows a calibration dongle connection sequence.

In the description to follow, parallel process streams are set forth with the understanding that the "process" being illustrated and described is a sequence of steps performed by the controller. Moreover, it is to be understood that the parallel operation of such streams is a convention understood by the person of ordinary skill in the art. The MCU 202 can run the various process streams sequentially, or in an interlaced fashion, but at such a speed that they appear parallel from the point of view of the system operator. These process streams are a probe disconnection sequence (stream F, FIG. 10E), a heater control sequence (stream H, FIG. 10F), a main data acquisition sequence (stream I, FIG. 10G), and a C/F change sequence (stream D, FIG. 10D).

Further, all error conditions encountered in the operational sequences illustrated in FIGS. 10B-10K result in the one of two possible outcomes. Errors related to a probe cause the system to display the error screen of FIG. 11J, then return to an error wait state at a current state in an operational sequence. System-related errors cause the system to display the error screen of FIG. 11I, then return to an error wait state for resolution of the error. In all error conditions, the heater is turned off and emulation is discontinued.

Referring now to FIGS. 10A and 10B, the first step 261 begins when the processing and display unit 42 is plugged in and power is available. In step 262, a control software program is initiated in the MCU 202. In step 263 the boot screen (FIG. 11A) is output on the display panel 43 during the BOOT state 250. After completion of software initialization, in step 264 the standby screen (FIG. 11B) is displayed. Then in step 265 the system is caused to enter the standby state 251 wherein it continuously attempts to confirm the presence of an EEPROM on a connected probe. If an EEPROM is detected, the switch 222 is placed in its second state and information is read from the EEPROM. The information includes at least probe authentication code and probe type data. In step 266 a checksum on the EEPROM is examined for consistency. For example, copies of the authentication and type data can be written at multiple locations and provided to a checksum algorithm for validation of the stored data. If the checksum is invalid, an error 267 is generated. In step 268 the authentication code read from the EEPROM is examined for consistency. If authentication is invalid, an error message 269 is generated. In step 270 a probe type parameter read from the EEPROM is examined to determine which type of probe is present. If the probe type is unrecognized, an error 271 is generated. Preferably, one or more probe types are recognized; for example any one of three probe types can be present on a probe. A first type, found in step 272, is a normal disposable ZHF probe used for measuring patient DTT. In this case, the program flow is directed to stream A, which continues in FIG. 10C. A second probe type, found in step 273, is a dongle, a device used to access restricted data or software for certain functions. For example, a calibration dongle configured to detachably connect to the signal interface cable connector 48 can be accessed by way of the signal interface cable. If this probe type is recognized, the program flow is directed to stream B, which continues in FIG. 10J. A third probe type, found in 274, is a firmware dongle used to access firmware of the system 40 for the purpose of upgrading, changing, or replacing programming. If this probe type is recognized, the program flow is directed to stream C, which continues in FIG. 10K.

The following EEPROM memory map and pseudo-code sequence illustrate a routine executed by the controller for detecting connection of a DTT probe:

DTT Probe EEPROM Memory Map

| Start Address | Data |
| --- | --- |
| A1 | Serial Number |
| A2 | Authentication Key |
| A3 | Sensor Type: DTT Probe |
| A4 | Sensor Revision |
| A5 | Checksum |
| A6 | Uses Remaining |
| A7 | Time Remaining |
| A8 | Skin Thermistor bias |
| A9 | Skin Thermistor coefficient A |
| A10 | Skin Thermistor coefficient B |
| A11 | Skin Thermistor coefficient C |
| A12 | Heater Thermistor bias |
| A13 | Heater Thermistor coefficient A |
| A14 | Heater Thermistor coefficient B |
| A15 | Heater Thermistor coefficient C |
| A16 | Error |
| A17 | Trend data |
| ... | ... |

Read/Initialize sequence
While in STANDBY, controller looks for a connected probe
 //The controller polls, looking for a response from an EEPROM by continually sending a Read command for the EEPROM//
 //When a probe is connected, its EEPROM acknowledges the command. When the controller sees this response, it knows a probe is now connected//
Upon detecting a connected probe, the controller reads contents of the EEPROM
The controller now operates using the data read from the EEPROM
 //No further READ operations occur except to verify EEPROM continuity and WRITE operations//
With the data read from the EEPROM, the controller proceeds to verify and categorize the probe
 //The size of the dataset is checked to help verify the data integrity//
 //The probe type and revision are checked to see if they are valid//
 //A checksum (CRC) is calculated over the data set and verified with a value that was stored in the EEPROM to ensure the integrity of the data//
 //An Authentication Key is verified to ensure the probe is authentic and un-tampered//
 //The probe database is checked to see if the probe has been tampered with//
 //The data is checked to verify that time and uses remain on the probe//
 //The data is checked to see if there is a past error saved on the probe//
If all of the data checks are passed, then the controller proceeds to test the physical attributes of the probe (heater, skin thermistor, heater thermistor).
Else, an error is displayed on the screen.
If all of the checks pass, then the controller proceeds on to the next state (moves from Standby to Ready).

In the probe connection sequence, stream A of FIG. 10C, once the system determines that a probe is connected, a sequence of connection steps is executed to prepare for operation when the probe is attached to a body for temperature monitoring. Initially, the integrity of the heater 126 is checked at step 280. Lack of electrical continuity in the heater circuit or inappropriate electrical resistance results in a probe error 281. Next, in step 282 the probe integrity is checked. Lack of electrical continuity in the thermistor circuits or inappropriate electrical resistance results in a probe error 283. Next, in step 284 a value of the probe revision is checked. In this regard, a probe revision parameter is used in case the data structure or the EEPROM changes, or other software-driven variants of the probe are desired. If the probe revision is not recognized, a probe error 285 is generated.

Continuing the sequence of FIG. 10C, the EEPROM contains parameters that are intended to limit extended use or reuse of the probe. For example, a use count parameter (in the Uses Remaining field in the DTT Probe EEPROM Memory Map) starts with a value greater than zero (4-6, for example) and is decremented by one count each time the probe is plugged in for use. In step 286 the use count on the EEPROM is checked, and if it is equal to zero, system operation is interrupted and a probe error 287 is generated. As a further example, a use time parameter (in the Time Remaining field in the DTT Probe EEPROM Memory Map) is stored on the EEPROM. As the system 40 operates, the EEPROM is periodically updated with new information (e.g., patient temperature). At this time, the current use time on the EEPROM is incremented downward by an appropriate time interval. If the check performed in step 288 finds that the use time is zero, a probe error 289 is generated. In yet another example, a serial number parameter implements measures to ensure that direct copies of the same probe (i.e., "direct knock offs") are detected. In this regard, a list of the most recent probe serial numbers used is maintained in nonvolatile memory of the MCU 202. If step 290 finds that particular probe has been used more than an allowed number of times, an error 291 is generated.

Continuing the sequence of FIG. 10C, in step 293 the system 40 enters the READY state 252, the ready screen of FIG. 11C is displayed, and PID control of the heater 126 commences. The screen instructs the user to attach the probe to the patient. There are a number of possible means to detect whether the probe has been attached to the patient. For example, attachment can be indicated by the divergence of the two temperature sensors over time (i.e. current $|T_h-T_s|$–previous $|T_h-T_s|$) above a given threshold. Another indication would be if skin temperature exceeded heater temperature by a set amount. In some instances, a preferred mode is to check that the skin temperature, as measured by thermistor 142, is above a threshold temperature (for example, 35° C.) and that a time-wise slope of skin temperature change is greater than a threshold value; for example, 1.5° C./5 seconds. The system remains in the READY state, step 294, until these conditions are fulfilled. Once it is determined that the probe has been attached to a patient, the system spawns parallel stream H (FIG. 10F) in step 295, spawns parallel stream I (FIG. 10G) in step 296, and spawns parallel stream D (FIG. 10D) in step 297.

Process stream D (FIG. 10D) monitors the C/F button 59 and changes Celsius to Fahrenheit or vice versa. Step 300 checks for a button-press event. If the current mode is Celsius, step 302 changes it to Fahrenheit. If the current mode is Fahrenheit, step 301 changes it to Celsius.

With process stream F (FIG. 10E), the system monitors for disconnection of the probe from the system. For example, if the probe is accidently dislodged or removed from the connector 48, it is desirable to alert a system operator. Accordingly, in step 305, the system determines whether continuity with the EEPROM has been interrupted by attempting to read from it. If signal continuity between the controller 200 and the probe has not been interrupted, the read is successful, and the system transitions to the succeeding state. If the read fails, the probe has been disconnected from the connector, and a series of steps are taken to return the system to the standby state 265. First, in step 306 PID control of the heater is deactivated. Next, in step 307 data acquisition from the thermistors is discontinued. Finally, in step 308 the external circuit to the EMU subsystem is deactivated. Then step 309 returns software control to step 265.

With process stream H (FIG. 10F), the controller maintains control of the heater 126. In step 310 a parallel process stream E is initiated to monitor the probe 44 for unsafe thermal conditions, while the controller continues to regulate operation of the heater 126 through the PID control method initiated in step 293. Next, in step 312 the controller checks whether the probe is still attached to the patient using methods described above for step 294. If the software detects numerical instability in the control loop, a probe error 313 results. In step 314 the allowable heater maximum output is increased to 90%. In step 315 the controller causes the system to enter the prewarming state (state 253 in FIG. 10A) and display the equilibration screen (FIG. 11D or 11E) on the display panel 43. An error in this state results in a probe error 316.

Figure 12:
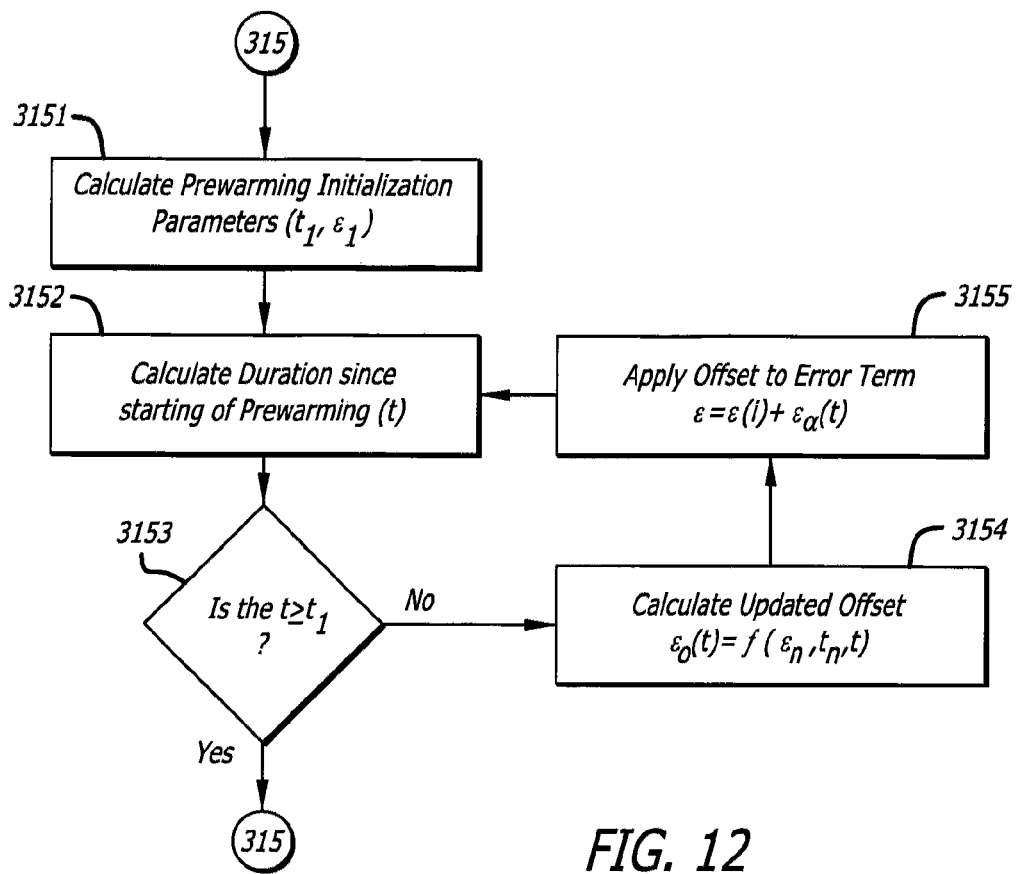
FIG. 12 is a flow diagram illustrating a preferred process for prewarming a DTT measurement probe.

Refer now to FIG. 12 which illustrates a preferred prewarming process in which the error value $\epsilon(i)$ that is used in the PID control algorithm to calculate u(T) is biased with a decaying offset term $\epsilon_o$ in which:

$$\varepsilon_0(t) = f_n = \varepsilon_n \frac{(t_n - t)}{t_n}$$

Figure 13:
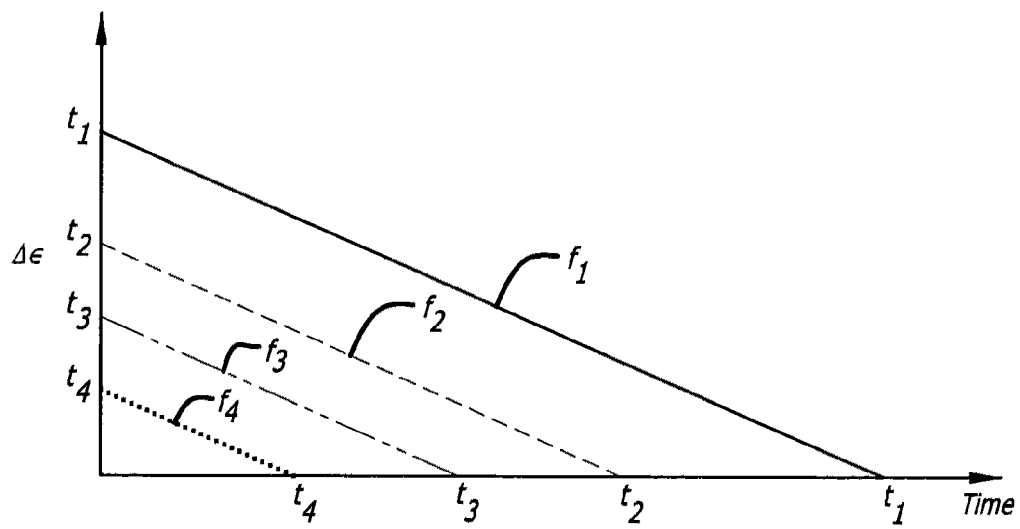
FIG. 13 is a family of curves illustrating an error bias function used in the preferred process of FIG. 12.
Figure 14:
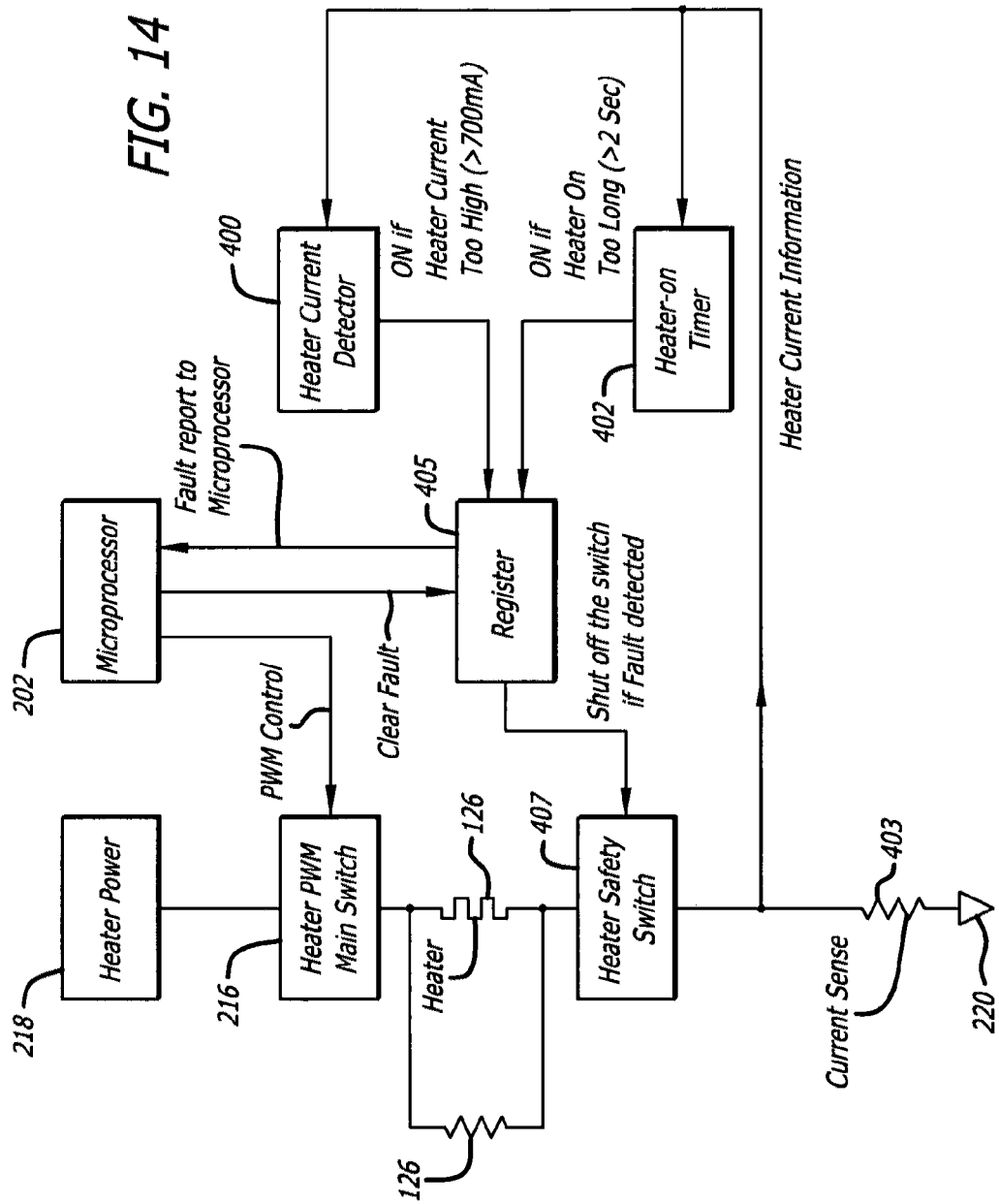
FIG. 14 is a block diagram of a preferred heater safety circuit of the zero-heat-flux DTT measurement system of FIG. 2.

A family of curves representing the decaying offset term is illustrated in FIG. 13. The effect of the decaying offset term is to set a target heater temperature above the transient skin temperature by an initial offset amount known as the initial error term offset ($\epsilon_n$). The offset is allowed to decay throughout the prewarming period for a duration ($t_n$) so that at the end of prewarming there is a smooth transition to normal PID heater control. As per FIG. 12, in step 3151 the controller determines initial prewarming parameters (initial error term offset ($\epsilon_n$) and prewarming duration ($t_n$)) preferably based on the current condition of the probe. One probe condition that can be used to generate these terms is a time-wise rate of change (slope) sensed by the skin thermistor 142. For example, if the slope of thermistor 142 is large (for example, greater than 3.6° C./minute), the probe is far from being equilibrated to the patient's DTT temperature and maximum prewarming is required. For this case $\epsilon_n$ is set to 3° C. ($\epsilon_1$ in FIG. 12) and $t_n$ would be set to 300 seconds ($t_1$ in FIG. 12). In another example, if the slope of thermistor 142 is moderate (for example, 0.75° C./minute) the probe is not equilibrated, but maximum prewarming would cause the probe to overshoot the patient's DTT temperature. In this case, the initial error term offset $\epsilon_n$ is set to 1.5° C. ($\epsilon_2$ in FIG. 13) and is set to 150 seconds ($t_2$ in FIG. 12). In a third case, if the slope of thermistor 142 is low (for example, 0.24° C./minute), possibly indicating a probe that was recently equilibrated became temporarily detached from the patient, no prewarming is needed and both $\epsilon_n$ and $t_n$ are set to zero. In step 3152 the duration since the prewarming initiation (t) is calculated. In step 3153 the duration calculated in step 3152 is compared to the prewarming duration ($t_n$) calculated in step 3151. If t is greater than or equal to $t_n$, prewarming is completed and process continues to step 317 of FIG. 10F. If t is less than $t_n$, the process continues to step 3154 where the updated offset term ($\epsilon_o(t)$) is calculated. In step 3155, a new error value $\epsilon$ is calculated by combining the error value $\epsilon(i)$ with the offset $\epsilon_o(t)$. This error value is used in the PID control of the heater 126. Although a linear function relating $\epsilon_o(t)$ to t is used, this is not intended to limit the prewarming step 315; in fact, other functions could be used.

With reference again to process stream H illustrated in FIG. 10F, upon completion of the prewarming step 315, the controller checks again for unusually high heater output in step 317. Then, in step 318, the controller causes the system to enter the equilibration state (254 in FIG. 10A), whereby PID control is applied to the heater 126 to attempt to bring the probe into a ZHF condition. An error in this state results in a probe error message 319. If ZHF is achieved, the controller checks for calibration of the EMU 227 in step 320. If the EMU is not calibrated, control returns to step 318. If EMU calibration is complete, the controller sends the system into a steady-state condition 321 where the emulator resistance is accessible to a connected patient monitor and the PID control is operated to maintain the ZHF condition. Any fault in this state results in a probe error message 322.

With process stream I (FIG. 10G), the controller initiates and maintains a main data acquisition sequence. In a first step 325, the controller initiates calibration of the EMU 227 by way of the process stream G (FIG. 10I). Next, in step 326, the controller determines the heater and skin temperatures ($T_h$ and $T_s$) sensed by the heater thermistor 140 and the skin thermistor 142. It should be noted that thermistor data obtained via the ADC 224 are in units of electrical voltage, which is converted to resistance and then to temperature. Within step 326, the resistance values are converted to temperature by applying the Steinhart-Hart coefficients stored on the EEPROM 170. Once converted, running averages of $T_h$ and $T_s$ are updated in step 327. The acquisition of the temperature data points can be much faster, but preferably, is performed once per second (1 Hz); accordingly, after each set of data points is obtained, data acquisition continues in step 328, and the current setoff data points is checked in step 329 to see if criteria for entering the equilibration state are met. Ideally, the zero-heat-flux condition is achieved when $T_h = T_s$, but this condition is rarely met precisely. In practice, the time-wise slope of the $T_h$ and $T_s$ temperature curves change very slowly as equilibration is approached, and sources of small instrumental error can cause the system to bounce into and out of the zero-heat-flux condition. In addition, it is not necessary to achieve an absolute absence of heat flux as long as the differences are within acceptable limits for accuracy. As an example, a probe is considered to have achieved a zero-heat-flux condition if: 1) the difference between $T_h$ and $T_s$ is less than a first threshold value (for example, 0.1° C.), and 2) the time-wise slope of $T_s$ is less than a second threshold value (for example, 0.06° C./minute).

If the criteria for equilibration are met, the controller, in step 337, causes the EMU system 227 to close the switch 234 to output signal jack 54 so as to provide the external patient monitor 56 with access to a resistance value equivalent to the patient temperature data. Then, in step 338, the controller initiates output of a steady screen (FIG. 11F or 11G) on the display panel 43 during the STEADY state 255 (FIG. 10A). At this time, in step 339, the controller conveys any changes in patient temperature to the EMU 227. Any fault in EMU operation causes a system error 340.

At periodic intervals, for example, every five minutes, data are updated on the EEPROM 170. In step 341, the controller determines if the time interval has elapsed. If not, another set of data points is acquired (step 326). Otherwise, the running average of patient temperature is written to the EEPROM (step 332), with a write-error resulting in a probe error message (step 333). Next, the use time value on the EEPROM is updated, reflecting the time interval used in step 341. If the probe 44 has been plugged in for a time less than the time interval (i.e., the first time this step has occurred during the current use), the use count parameter read from the EEPROM is decremented by one (step 335) and the decremented use count is written to the EEPROM. As should be evident, the use count is decremented only once each time a probe is plugged in, and then only if a main data acquisition sequence has been initiated and the system has reached equilibrium (step 329) with no update error (step 340) and no trend write error (step 333). Stated another way, the use count is checked once (FIG. 10C, steps 286 and 288) and, if the use count has not reached a blocking value (zero in this example) during a previous connection sequence, it is decremented once during the current probe connection sequence. Finally, the list of used probe serial numbers in MCU memory is updated (step 336). Then, another set of data points is acquired (step 326).

If, in step 329, the controller determines that the probe 44 does not meet the criteria for equilibration, the EMU 227 is turned off (330), and, in step 331, the system remains in the EQUILIBRATION state 254 (FIG. 10A), showing the equilibration screen (FIG. 11D or 11E) on display 43.

With process stream E (FIG. 10H), the controller performs an ongoing check for fault conditions in the probe 44. First, in step 342, the controller checks skin temperature $T_s$ for values above an unsafe threshold, for example 43° C., with a fault resulting in a probe error 343. Next, in step 344, the controller makes a similar check of heater temperature $T_h$, with a fault resulting in a probe error 345. Then, in step 346, the controller compares the magnitude of the difference between $T_s$ and $T_h$ with a threshold value (for example 10° C.), to ensure that the two thermistor values are consistent with each other. A fault in this step results in a probe error 347. In step 348, the controller checks the operation of the heater 126 with a fault resulting in a probe error 349.

In respect of step 348, with the preferred mode of heater control being pulse width modulation, a simple and effective heater safety circuit observes the heater operational parameters: a level of current through the heater, and a time that the heater remains on during any pulse of the PWM signal. A current level higher than a predetermined safety level (700 mA, for example) indicates a possible short circuit condition in the heater. A pulse width longer than a predetermined time (2 seconds, for example) indicates a possible fault that causes the heater switch 216 to stay on too long (which will overdrive the heater). A preferred heater safety circuit for a PWM heater control mode is illustrated in FIG. 13. The heater safety circuit includes a heater current detector 400, a heater-on timer 402, a register 405 of the MCU 202, a current sense resister 403, and a heater safety switch 407. Preferably, but not necessarily, the elements of the heater safety circuit are located in the controller 200. Of course, the heater 126 is located on a probe 44. With the heater switch 216 closed a pulse of current is drawn by the heater 126. The current magnitude is sensed by the resistor 403 and the resulting voltage is input to both the current detector 400 and the timer 402. The current detector 400 monitors the level of the input voltage. When the current pulses on, the timer 402 begins a count down. If the magnitude of the current exceeds the safety level, the current detector 400 generates a fault indication that is stored in the register 405. If the timer 402 does not count out before the pulse falls, it is reset to zero and starts another count from zero with the next pulse. If the timer counts out before the pulse falls to zero, it generates a fault indication that is stored in the register 405. A fault indication in the register 405 is reported to the MCU 202 and at the same time causes the heater safety switch 407 to open, which halts current flow to the heater 126. When a heater safety fault occurs, the MCU 202 writes an error code to the probe, which marks the probe as faulty and prevents it from being used again. The MCU 202 then erases the fault from the register, thereby closing the safety switch 407

Finally, in step 350, the controller applies criteria for detachment of the probe from a patient. In this regard, either: skin temperature falls below 30° C. and skin temperature is below heater temperature by a predetermined value (for example, 1.0° C.); or the slope of the skin temperature is <−625 m° C./5 seconds. If either condition is met, the controller, in step 351, returns the system to the READY state 252 (FIG. 10A).

With process stream G (FIG. 10I) the operation of the EMU 227 is initiated and maintained. As described elsewhere, the EMU periodically self-calibrates in order to provide an output that accurately emulates patient temperature in YSI-400 format. Preferably, calibration is actually performed in two stages: coarse and fine. Coarse calibration can be a relatively lengthy process (e.g., several minutes), therefore it is performed during the EQUILIBRATION state 254 (FIG. 10A) so as not to delay the output of patient temperature. If coarse calibration fails (step 353), a system error 354 occurs. If coarse calibration is successful, in step 355 the controller causes a delay of some interval, for example, five minutes, after which a fine calibration of the EMU occurs (step 356). Fine calibration is a shorter process than coarse calibration, for example, requiring less than one second to complete.

In some aspects, a calibration dongle is used to check the calibration of the zero-heat-flux DTT measurement system 40 (process stream B) and to initiate calibration of the emulation system (process stream G). In this regard, with process stream B (FIG. 10J), the controller enables a system operator to check the calibration of the system with a calibration dongle. This dongle resembles a probe, in that it connects to the patient cable and has an EEPROM for storage of S-H coefficients. However, the dongle differs from a probe by having precision resistors rather than thermistors. The resistance values of these resistors are chosen to provide a standard output that can be read on the display panel 43 and the patient monitor 56. By this process, a complete verification of system function and accuracy is provided. Initially, in step 360, the controller initiates calibration of the EMU 227 by way of the parallel process stream G (FIG. 10I). Next, the controller determines temperatures of the skin thermistor $T_s$ and heater thermistor $T_h$ in step 361. It should be noted that thermistor data obtained via the ADC 224 are in units of ADC counts, which are converted into units of resistance (ohms). Within step 361, the resistance values are converted to temperature by applying the Steinhart-Hart coefficients stored on the dongle's EEPROM. In step 362, the controller updates the EMU 227 with the current value of $T_s$. Then, the controller outputs a calibration screen (FIG. 11K), with display continuing until the dongle is detached.

Figure 11M:
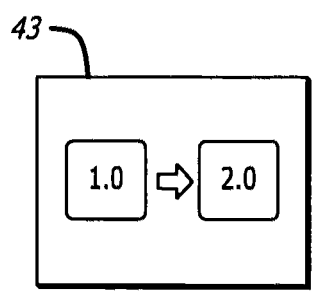

In some aspects, a dongle is used to update programming of the zero-heat-flux DTT measurement system 40. Process stream C (FIG. 10K) enables a system operator to update the firmware of the controller 200 by means of a firmware update dongle. This dongle resembles a normal probe, in that is connects to the connector 48 of the patient cable 46 and has an EEPROM; however it has no heater or thermistors. First, step 370 verifies a checksum of the contents of the EEPROM, resulting in an error 371 if incorrect. Then, step 372 causes update screen #1 (FIG. 11L) to be displayed. In step 373, the user confirms the update by pressing the C/F button 59. At this point, a check is made if the dongle is detached 374, followed by a return to the STANDBY state 251 (FIG. 10A). (This check is repeated following each of following steps 378, 380, 381, 382, and 383.) If a button press is detected, step 377 changes the display panel 43 to update screen #2 (FIG. 11M). Step 378 verifies a loader checksum, with a fault resulting in a probe error 379. Step 380 decrypts the updated software from the dongle's EEPROM and runs the firmware update code. Upon completion of the firmware update, step 381, the system verifies the checksum. If the checksum is incorrect, the system reverts to previous version of the firmware, step 588. Step 382 performs cleanup by erasing the old version of the firmware from memory, followed by rewriting of the system's authentication keys, 383. Finally, step 384 causes the DTT measurement system to reset to the new firmware, following which, the firmware update dongle is detached, step 385.

Figure 15:
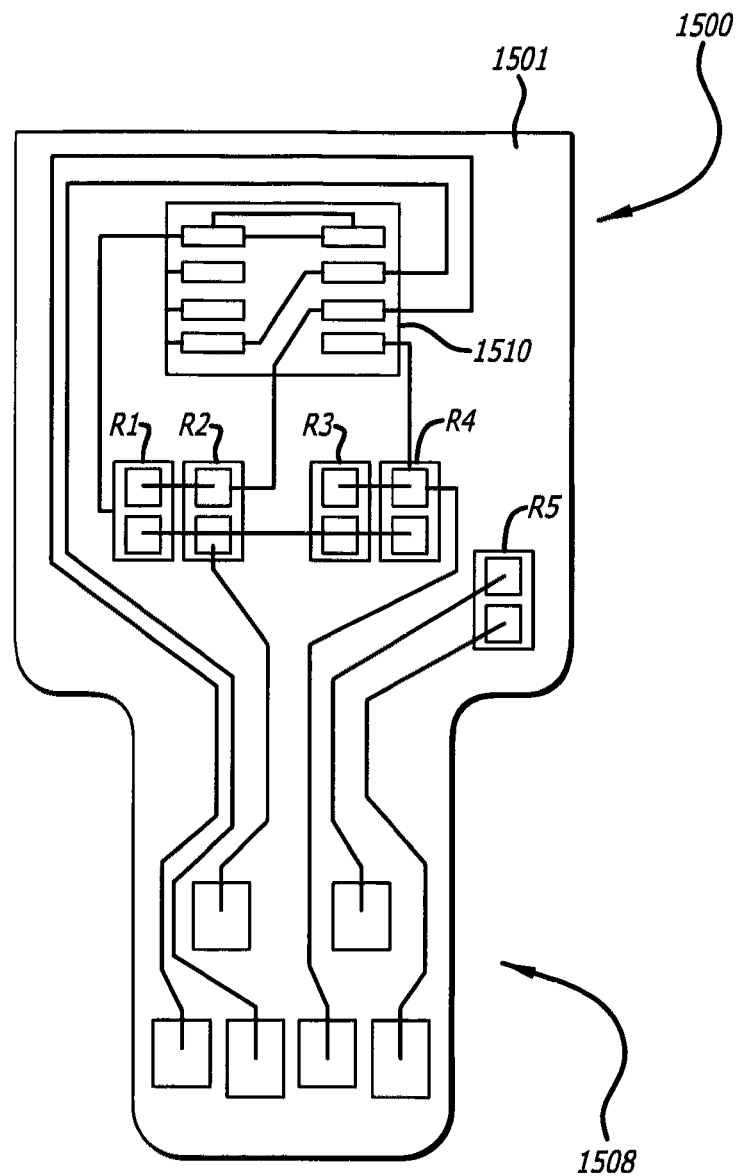
FIG. 15 is a plan view of a representative dongle construction used for calibration and/or programming the zero-heat-flux DTT measurement system of FIG. 2.

FIG. 15 illustrates a dongle construction that can be used for calibration and programming. The dongle 1500 is shown in plan, with the view directed toward a dongle surface 1501 on which electronic components are mounted. In this dongle construction, components are mounted to one surface of a rigid circuit board configured with a tab 1508 that can be physically, releasably, and electrically connected to the patient sensor cable 46 in the same manner as a DTT probe. The dongle is constructed to accommodate an 8-pin SOIC (small-outline integrated circuit) EEPROM 1510 along with five surface mounted resistors R1-R5.

Typically less storage space is required for calibration than for programming, and so use of an 8-pin SOIC EEPROM permits both the calibration dongle and the programming dongle to share the same PCB. The wiring of the EEPROM, particularly with the WP (write protect) wired to the Vss (ground) in the circuit, allows both reading and writing to the EEPROM while attached to the dongle circuitry.

The calibration dongle preferably requires high precision (0.1%) resistors whose resistance matches closely with that of a 10 KΩ thermistor near 36° C. The programming dongle only requires a low precision pull-up resistor whose resistance is 10 kΩ. The position of the resistors on the PCB allows the circuit to be visually identified. That is, if surface mounted resistors are placed in positions R1 and R3, the dongle can be identified programming dongle. A low precision 6.2Ω resistor can, optionally, populate position R5. This position allows the heater circuitry to be checked Although principles of measurement system and probe construction and operation have been described with reference to presently preferred embodiments, it should be understood that various modifications can be made without departing from the spirit of the described principles. Accordingly, the principles are limited only by the following claims.

The invention claimed is:

1. A zero-heat-flux temperature measurement system for measuring deep tissue temperature using a probe with first and second flexible substrate layers sandwiching a layer of thermally insulating material and a tab with electrical connection pads, in which a heater and a first thermal sensor are disposed on the first substrate layer, a second thermal sensor and a programmable memory device are disposed on the second substrate layer, the system including:
    a controller with a signal connector jack and an emulator;
    a probe signal interface cable with first and second ends;
    a first connector attached to the first end of the probe signal interface cable for detachably connecting to the tab;
    a second connector attached to the second end of the probe signal interface cable for being inserted into and removed from the signal connector jack in the controller;
    in which the probe signal interface cable and the first and second connectors are a single integrated element separate from the probe,
    in which the controller includes probe control logic, and the zero-heat-flux temperature system further includes an information switch having a first state in which the information switch is operative to connect thermistor signals from the probe signal interface cable to the probe control logic and a second state in which the information switch is operative to connect programmable memory device information from the probe signal interface cable to the control logic.

2. The zero-heat-flux temperature measurement system of claim 1, including a heater switch operative to switch a pulse-width-modulated drive signal through the probe signal interface cable to the heater.

3. The zero-heat-flux temperature system of claim 1, including a heater switch operative to switch a pulse-width-modulated drive signal through the probe signal interface cable to the heater.

4. The zero-heat-flux temperature system of claim 3, in which the first state of the information switch blocks the transfer of programmable memory device signals from being transferred through the probe signal interface cable and the second state of the information switch enables the transfer of programmable memory device signals through the probe signal interface cable.

5. The zero-heat-flux temperature system of claim 4, further including an emulation unit with an emulation output jack, and an emulation output cable connected to the emulation output jack.

6. The zero-heat-flux temperature system of claim 5, in which the emulation unit emulates a YSI-400 thermistor.

7. A deep tissue temperature measurement system, including:
    a zero-heat-flux measurement probe with a heater, a first thermal sensor operative to sense a heater temperature, a second thermal sensor operative to sense a skin temperature, and a programmable memory device, and a connector interface;

a processing unit with a probe signal connector and an emulator jack;

a probe signal interface cable with first and second ends;

a first connector attached to the first end of the probe signal interface cable and connected to and removed from the probe connector interface;

a second connector attached to the second end of the probe signal interface cable for being inserted into and removed from the probe signal connector;

in which the probe signal interface cable and the first and second connectors are a single integrated element separate from the probe; and, a thermistor emulator operative to provide an emulator output signal at the emulator jack, in which the processing unit includes a controller, and the deep tissue temperature system further includes an information switch having a first state in which the information switch is operative to connect thermistor signals from the probe signal interface cable to the controller and a second state in which the information switch is operative to connect programmable memory device information from the probe signal interface cable to the controller and to connect information from the controller to the programmable memory device.

8. The deep tissue temperature measurement system of claim 7, further including a heater switch operative to switch a heater drive signal through the probe signal interface cable to the heater.

9. The deep tissue temperature measurement system of claim 7, including a heater switch operative to switch a pulse-width-modulated drive signal through the probe signal interface cable to the heater.

10. The deep tissue temperature measurement system of claim 8, in which the first state of the information switch blocks the transfer of programmable memory device signals from being transferred through the probe signal interface cable and the second state of the information switch enables the transfer of programmable memory device signals through the signal interface cable.

11. The deep tissue temperature measurement system of claim 7, further including an emulation output cable connected to the emulator jack.

12. The deep tissue temperature measurement system of claim 11, in which the thermistor emulator emulates a YSI-400 thermistor.

13. A zero-heat-flux, deep tissue temperature measurement controller-executed method of measuring deep tissue temperature using a zero-heat-flux temperature measurement probe with a heater and a first thermal sensor disposed on a first substrate layer, and a second thermal sensor and a programmable memory device disposed on a second substrate layer, by the zero-heat-flux deep tissue temperature measurement controller-executed steps of:

setting an information switch to a first state;

reading thermistor calibration information from the programmable memory device through the information switch in the first state;

setting the information switch to a second state;

and then controlling the probe by the following control loop:

reading heater and skin temperature signals from the first and second thermal sensors, respectively, through the information switch in the second state;

generating heater and skin temperature values by combining the heater and skin temperature signals with the thermistor calibration information;

generating a pulse-width-modulated heater drive signal based on the heater and skin temperature values;

applying the heater drive signal to the heater;

displaying the skin temperature value as a deep tissue temperature; and, turning the heater off if respective heater or temperature limits are exceeded, otherwise, executing the control loop again.

14. The method of claim 13, further including the zero-heat-flux deep tissue temperature measurement controller-executed step of emulating a thermal sensor output in response to the skin temperature value.

15. The method of claim 14, in which the zero-heat-flux deep tissue temperature measurement controller-executed step of emulating a thermal sensor output in response to the skin temperature value includes the zero-heat-flux deep temperature measurement controller-executed step of controlling a thermistor emulator in response to the skin temperature value.

16. The method of claim 14, in which the zero-heat-flux deep tissue temperature measurement controller-executed step of emulating a thermal sensor output in response to the skin temperature value includes the zero-heat-flux deep tissue temperature measurement controller-executed step of emulating a YSI-400 thermistor in response to the skin temperature value.

17. The method of claim 14, in which the zero-heat-flux deep tissue temperature measurement controller-executed step of generating a pulse-width-modulated heater drive signal based on the heater and skin temperature values includes the zero-heat-flux deep tissue temperature measurement controller-executed steps of:

combining the heater and skin temperature values to obtain a difference value;

generating a proportional-integral-derivative value in response to the difference value; and, applying the proportional-integral-derivative value to a voltage-controlled oscillator.

18. The method of claim 17, in which the zero-heat-flux deep tissue temperature measurement controller-executed step of emulating a thermal sensor output in response to the skin temperature value includes the zero-heat-flux deep tissue temperature measurement controller-executed step of emulating a YSI-400 thermistor in response to the skin temperature value.

19. A combination for measuring deep tissue temperature, comprising:

a zero-heat-flux probe with first and second flexible substrate layers sandwiching a layer of thermally insulating material, a heater and a first thermal sensor disposed on the first substrate layer, a second thermal sensor and a programmable memory device disposed on the second substrate layer, and a tab with electrical connection pads appended to the probe;

a signal interface cable with first and second ends, a first connector attached to the first end and detachably connected to the tab, and a second connector attached to the second end for removable insertion into a signal connector jack;

a zero-heat-flux controller in electrical communication with the signal connector jack and configured to exchange signals with the zero-heat-flux probe so as to read thermistor calibration information from the programmable memory device and heater and skin temperature signals from the first and second thermal sensors, respectively, in which the zero-heat-flux controller is further configured to:
  generate heater and skin temperature values by combining the heater and skin temperature signals with the thermistor calibration information;
  generate a pulse-width-modulated heater drive signal based on the heater and skin temperature values;
  apply the heater drive signal to the heater via the signal interface cable;
  display the skin temperature value as a deep tissue temperature value; and,
  turn the heater off if respective heater or temperature limits are exceeded.

20. The combination for measuring deep tissue temperature of claim 19, in which the zero-heat-flux controller is further configured to generate an output signal emulating the response of a thermistor to the deep tissue temperature value.

21. The combination for measuring deep tissue temperature of claim 19, in which the zero-heat-flux controller is further configured to generate the pulse-width-modulated heater drive signal by subjecting a difference between the heater and skin temperature values to a proportional-integral-derivative formula.

22. The combination for measuring deep tissue temperature of claim 21, in which the zero-heat-flux controller is further configured to emulate the output of a YSI-400 thermistor in response to the skin temperature value.

* * * * *